(12) United States Patent
Doi

(10) Patent No.: US 8,618,461 B2
(45) Date of Patent: Dec. 31, 2013

(54) SOLID-STATE IMAGING DEVICE AND IMAGING DEVICE

(71) Applicant: Panasonic Corporation, Osaka (JP)

(72) Inventor: Hirotaka Doi, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/771,148

(22) Filed: Feb. 20, 2013

(65) Prior Publication Data

US 2013/0161488 A1    Jun. 27, 2013

Related U.S. Application Data

(63) Continuation of application No. PCT/JP2011/004641, filed on Aug. 19, 2011.

(30) Foreign Application Priority Data

Sep. 7, 2010  (JP) ................................. 2010-200372

(51) Int. Cl.
*H01L 27/00* (2006.01)
*H04N 5/335* (2011.01)

(52) U.S. Cl.
USPC ................. 250/208.1; 250/214 DC; 348/294; 348/301

(58) Field of Classification Search
USPC ................. 250/208.1, 214.1, 214 A, 214 DC, 250/214 LS, 214 R; 348/294, 300, 301, 308; 341/126, 155
See application file for complete search history.

(56) References Cited

U.S. PATENT DOCUMENTS

| 2006/0186315 A1 | 8/2006 | Lee et al. | |
|---|---|---|---|
| 2007/0024731 A1* | 2/2007 | Muramatsu et al. | 348/308 |
| 2012/0176501 A1* | 7/2012 | Yoo et al. | 348/207.1 |

FOREIGN PATENT DOCUMENTS

| JP | 2006-203929 | 8/2006 |
|---|---|---|
| JP | 2006-238444 | 9/2006 |
| JP | 2008-172609 | 7/2008 |
| JP | 2010-57019 | 3/2010 |

OTHER PUBLICATIONS

International Search Report of PCT Application No. PCT/JP2011/004641 dated Sep. 13, 2011.

* cited by examiner

*Primary Examiner* — Kevin Pyo
(74) *Attorney, Agent, or Firm* — McDermott Will & Emery, LLP

(57) ABSTRACT

A solid-state imaging device includes a plurality of AD conversion units respectively provided in a plurality of columns and each configured to convert a pixel signal converted by unit pixels provided in an associated column into digital data of N bits, and a plurality of data storage units respectively provided in the columns. The data storage units each include N flip-flop circuits. The solid-state imaging device further includes data switching units each configured to switch between a first state in which the digital data converted by the AD conversion unit is stored in the data storage unit of the associated column, and a second state in which the N flip-flop circuits in each of the data storage units are serially connected.

16 Claims, 24 Drawing Sheets

SOLID-STATE IMAGING DEVICE AND IMAGING DEVICE

CROSS REFERENCE TO RELATED APPLICATIONS

This is a continuation application of PCT International Application No. PCT/JP2011/004641 filed on Aug. 19, 2011, designating the United States of America, which is based on and claims priority of Japanese Patent Application No. 2010-200372 filed on Sep. 7, 2010. The entire disclosures of the above-identified applications, including the specifications, drawings and claims are incorporated herein by reference in their entirety.

FIELD

The present invention relates to a solid-state imaging device and an imaging device.

BACKGROUND

Various proposals have recently been made on signal reading performed by a CMOS image sensor. In general, CMOS image sensors based on column-parallel outputting, configured to select pixels of one line out of a pixel array and simultaneously read signals from those pixels in a column direction, are widely employed.

An example of such CMOS image sensors disclosed in Patent Document 1 will be described referring to FIG. 17. FIG. 17 is a schematic diagram showing a configuration of a conventional CMOS solid-state imaging device (CMOS image sensor) 1 in which an AD conversion circuit and a pixel portion are mounted on the same semiconductor substrate.

As shown in FIG. 17, the solid-state imaging device 1 includes a pixel array (imaging unit) 10 including a plurality of unit pixels 3 arranged in a matrix pattern, a drive control unit 7 provided outside the pixel array 10, a column processing unit 26, and an output circuit 28. The column processing unit 26 includes column AD circuits 25 respectively provided for each of vertical columns.

The column AD circuits 25 each include an AD conversion unit (ADC) 251 that converts a pixel signal into digital data, and a data storage unit (memory) 256 that stores the digital data.

The drive control unit 7 includes a horizontal scanning unit 12 that controls column addresses and column scanning circuits, a vertical scanning unit 14 that controls row addresses and row scanning circuits, and a communication timing control unit 20 that generates internal clocks on the basis of a master clock CLK0 received from outside to thereby control the horizontal scanning unit 12 and the vertical scanning unit 14.

Each of the unit pixels 3 is connected to a row control line 15 controlled by the vertical scanning unit 14 and a vertical signal line 19 through which the pixel signal is transmitted to the column processing unit 26.

In the solid-state imaging device 1 thus configured, the pixel signal outputted from the unit pixel 3 of each vertical column is provided to the column AD circuit 25 of the column processing unit 26 through the vertical signal line 19.

The column AD circuits 25 each include a data storage unit 256 that serves as a memory of N bits for storing a counting result retained by the AD conversion unit 251, the data storage unit 256 being located posterior to the AD conversion unit 251.

In addition, the column AD circuits 25 each include a data switching unit (SEL) 258 that switches the data inputted to the data storage unit 256.

The data switching units 258 receive a memory transfer command pulse, which is a controlling pulse common to all the data switching units 258, from the communication timing control unit 20 at a predetermined timing.

Upon receipt of the memory transfer command pulse, the data switching unit 258 transfers data outputted from the corresponding AD conversion unit 251 of the same column to the data storage unit 256. The data storage unit 256 retains and stores the transferred data.

Here, the data switching unit 258 not only transfers the data outputted from the AD conversion unit 251 of the same column to the data storage unit 256, but also transfers data stored in the data storage unit 256 of another column to the data storage unit 256 of the same column.

The horizontal scanning unit 12 serves as a read scanning unit that reads data stored in the data storage units 256 while the AD conversion unit 251 is performing the assigned function.

The output terminal of the data storage unit 256 is connected to a horizontal signal line 18. The horizontal signal line 18 has a width corresponding to N bits which is the bit width of the column AD circuit 25, and is connected to the output circuit 28. The output circuit 28 includes n pieces of sense circuits respectively corresponding to the output lines (not shown).

In particular, the device including the data storage unit 256 configured as above is capable of transferring AD conversion data retained by the AD conversion unit 251 to the data storage unit 256. Accordingly, the device is capable of independently controlling the AD conversion process of the AD conversion unit 251 and the reading of the result of AD conversion into the horizontal signal line 18. Therefore, the device can perform a pipeline operation in which the AD conversion and the signal reading to outside are performed in parallel.

For example, in the case where the column AD circuit 25 is configured to perform AD conversion based on single slope integration, the column AD circuit 25 reads out a pixel signal from the pixel array 10 at a predetermined timing in a horizontal period, and performs the AD conversion based on single slope integration with the pixel signal read out to thereby output a result of the AD conversion at a predetermined timing. In this process, first a voltage comparator included in the AD conversion unit 251 compares a reference signal for comparison (substantially for the AD conversion process) with the pixel signal inputted through the vertical signal line 19, and inverts the output signal of the voltage comparator when the voltages become the same. For example, the voltage comparator outputs a H-level signal such as a power source potential in an inactive state, and outputs a L-level signal (active state) when the pixel signal and the reference signal agree with each other.

A counter provided posterior to the voltage comparator starts counting operation in synchronization with the transition of the reference signal, either in a down-counting mode or up-counting mode, and stops counting when the output signal of the comparator is inverted and latches (retains and stores) the counted value at that moment as the pixel data, thus completing the AD conversion. Then the AD conversion unit 251 transfers the pixel data to the data storage unit 256 at a predetermined timing, for retaining and storing therein the pixel data.

Thereafter, the column AD circuit 25 sequentially outputs the pixel data in the data storage unit 256 to outside of the column processing unit 26, by shifting operations synchronized with clock signals inputted at a predetermined timing. As a result, picture data (pixel data) is outputted to outside of the chip including the pixel array 10.

CITATION LIST

Patent Literature

[PTL 1] Japanese unexamined patent application publication No. 2008-172609

SUMMARY

Technical Problem

With the conventional technique, however, the column AD circuit is only capable of transferring the data of the AD conversion unit of the same column to the data storage unit, and transferring the data in the data storage unit of another column to the data storage unit of the same column. Accordingly, a first drawback of the conventional technique is that a circuit for handling the data has to be provided outside the column processing unit, in order to amplify the data of the AD conversion unit.

In addition, the region where the data storage unit can be located, which depends on the width of the pixel array, is becoming smaller because of the recent requirement for increased number of pixels. Accordingly it is quite difficult to insert a logic circuit for inspecting the data storage unit. Thus, a second drawback of the conventional technique is that, when a defect arises in the data storage unit, it is quite difficult to identify the detective defective point and, even though successful, it takes a long time to identify.

The present invention has been accomplished in view of the foregoing problem, and provides a solid-state imaging device capable of amplifying digital data converted by an AD conversion unit without providing an additional circuit outside a column processing unit, and identifying a defective point in a data storage unit easily and quickly, and an imaging device incorporated with such a solid-state imaging device.

Solution to Problem

In an aspect, the present invention provides a solid-state imaging device, including a plurality of unit pixels that each converts incident light into a pixel signal, the unit pixels being arranged in rows and columns; a plurality of AD conversion units respectively provided in a plurality of columns and each configured to convert the pixel signal converted by the unit pixel located in an associated column into digital data of N bits, N being an integer not smaller than 2; and a plurality of data storage units respectively provided in the plurality of columns. The data storage units each include N flip-flop circuits respectively corresponding to bits of the digital data of N bits. The solid-state imaging device further includes a plurality of data switching units each configured to switch between a first state in which the digital data of N bits converted by the AD conversion unit is stored in the data storage unit of the associated column, and a second state in which the N flip-flop circuits included in each of the data storage units are serially connected.

With the solid-state imaging device thus configured, the digital data outputted from the AD conversion unit can be transferred to the data storage unit of the same column, in the first state. In addition, in the second state the digital data can be amplified by shifting the bits of the data stored in the data storage unit of the same column. Accordingly, the solid-state imaging device configured as above is capable of amplifying the digital data converted by the AD conversion unit without providing an additional circuit outside the column processing unit. In addition, the solid-state imaging device is also capable of identifying a defective point in the data storage unit easily and quickly, by selecting the second state.

In the solid-state imaging device, the data switching units may be configured to switch among the first state, the second state, and a third state in which the data storage units respectively provided in the plurality of columns are serially connected.

Such an arrangement enables the data stored in the data storage units to be shifted in a horizontal direction, in the third state.

The solid-state imaging device may include a plurality of column blocks each associated with a column unit including a predetermined number of columns, and each including a plurality of the AD conversion units and a plurality of the data storage units, the AD conversion units and the data storage units being associated with the column unit. The data switching units may be configured to serially connect, in each of the column blocks, the data storage units in the column block in the third state.

Such a configuration enables, in each of the column blocks, the data stored in the data storage units included in the same column block to be shifted in a horizontal direction, in the third state.

In the solid-state imaging device, the data switching units may be configured to serially connect, in each of the column blocks, all of the flip-flop circuits in the column block in the second state.

Such an arrangement enables, in each of the column blocks, the data stored in the flip-flop circuits included in the same column block to be shifted in a vertical direction, in the second state.

The solid-state imaging device may further include a control unit configured to control the data storage units and the data switching units. The control unit may be configured to store the digital data of N bits converted by the AD conversion unit in the data storage unit of the associated column after setting the data switching units to the first state, and amplify the digital data stored in the data storage unit by shifting each bit of the digital data toward a high-order bit, after setting the data switching units to the second state.

Such an arrangement enables the data stored in the data storage units of the same column to be amplified by shifting the bits, in the second state. Therefore, the solid-state imaging device configured as above is capable of amplifying the digital data converted by the AD conversion unit without providing an additional circuit outside the column processing unit.

In the solid-state imaging device, the data switching units may be configured to serially connect, in the second state, the flip-flop circuits each located at a first stage of the N flip-flop circuits serially connected in the associated column, in the same sequence as in the third state.

Such an arrangement enables a desired value to be set in the flip-flop circuit of the first stage without incurring an increase in circuit scale. Therefore, the solid-state imaging device configured as above is capable of identifying a defective point in the data storage unit easily and quickly.

In the solid-state imaging device, the data switching units may each include a logic level switching unit configured to output, in the second state, a signal of a first logical value to the flip-flop circuit at a first stage of the N flip-flop circuits serially connected.

Such a configuration enables a first logical value to be set in the flip-flop circuit of the first stage, in the second state. Therefore, the solid-state imaging device configured as above is capable of identifying a defective point in the data storage unit easily and quickly. In addition, the solid-state imaging device can set, when amplifying the data, the value of the lowest bit of the amplified data as the first logical value.

In the solid-state imaging device, the logic level switching unit may be configured to selectively output, in the second state, one of the signal of the first logical value and a signal of a second logical value to the flip-flop circuit at the first stage.

Such an arrangement enables a desired value to be set in the flip-flop circuit of the first stage, in the second state. Therefore, the solid-state imaging device configured as above is capable of identifying a defective point in the data storage unit easily and quickly. In addition, the solid-state imaging device can set, when amplifying the data, a desired value in the lowest bit of the amplified data.

In the solid-state imaging device, the data switching units may each include a logic level switching unit configured to output, in the third state, a signal of a first logical value to the data storage unit at a first stage of the data storage units serially connected.

Such a configuration enables the first logical value to be set in the data storage unit of the first stage, in the third state. Therefore, the solid-state imaging device configured as above is capable of identifying a defective point in the data storage unit easily and quickly.

In the solid-state imaging device, the logic level switching unit may be configured to selectively output, in the third state, one of the signal of the first logical value and a signal of a second logical value to the data storage unit at the first stage.

Such an arrangement enables a desired value to be set in the data storage unit of the first stage, in the third stage. Therefore, the solid-state imaging device configured as above is capable of identifying a defective point in the data storage unit easily and quickly.

In the solid-state imaging device, the logic level switching unit may be further configured to selectively output, in the second state, one of the signal of the first logical value and the signal of the second logical value to the flip-flop circuit at the first stage of the N flip-flop circuits serially connected.

Such an arrangement enables a desired value to be set in the flip-flop circuit in the second state and the third state, without incurring an increase in circuit scale. Therefore, the solid-state imaging device configured as above is capable of identifying a defective point in the data storage unit easily and quickly.

The solid-state imaging device may further include a control unit configured to provide (i) a clock signal of a first frequency to the plurality of flip-flop circuits, after setting the data switching unit to the first state, and (ii) a clock signal of a second frequency lower than the first frequency to the flip-flop circuits, after setting the data switching unit to the second state.

Such a configuration mitigates restriction on the wiring layout, in the case where the freedom in designing the wiring for performing the vertical shifting is restricted.

In the solid-state imaging device, the control unit may be further configured to provide the clock signal of the first frequency to the flip-flop circuits, after setting the data switching unit to the third state.

Such an arrangement enables not only a stuck-at fault but also a delay fault in the data storage unit to be detected.

The solid-state imaging device may further include a defect information storage unit configured to store defect information indicating a data storage unit of which column has a defect, among the plurality of data storage units; a redundant data storage unit; and a redundant switching unit configured to replace the data storage unit of the column indicated by the defect information, with the redundant data storage unit.

Such a configuration enables, in the case where a defect arises in the data storage unit, the defect in the data storage unit to be recovered. Therefore, the yield of the solid-state imaging device can be improved.

The solid-state imaging device may further include a defect information storage unit configured to store defect information indicating a flip-flop circuit of which column and which bit has a defect, among the plurality of flip-flop circuits; a plurality of redundant flip-flop circuits respectively provided in the plurality of columns; and a redundant switching unit configured to replace the flip-flop circuit of the column and the bit indicated by the defect information, with the redundant flip-flop circuit provided in the corresponding column.

Such a configuration enables, in the case where a defect arises in the data storage unit, the defect in the data storage unit to be recovered. Therefore, the yield of the solid-state imaging device can be improved.

The present invention may be realized not only as the aforementioned solid-state imaging device, but also as a driving method or controlling method of the solid-state imaging device including the distinctive operations performed by the constituents thereof, or as a program that causes a computer to execute those operations. Naturally, such a program may be distributed through a communication network such as Internet.

Further, the present invention may be realized as a large-scale integrated circuit (LSI) that performs a part or whole of the functions of the solid-state imaging device, or as an imaging device incorporated with the solid-state imaging device.

Advantageous Effects

As described above, the present invention provides a solid-state imaging device capable of amplifying the digital data converted by the AD conversion unit without providing an additional circuit outside the column processing unit, and identifying a defective point in the data storage unit easily and quickly.

BRIEF DESCRIPTION OF DRAWINGS

These and other objects, advantages and features of the invention will become apparent from the following description thereof taken in conjunction with the accompanying drawings that illustrate a specific embodiment of the present invention.

DESCRIPTION OF EMBODIMENTS

Figure 1:
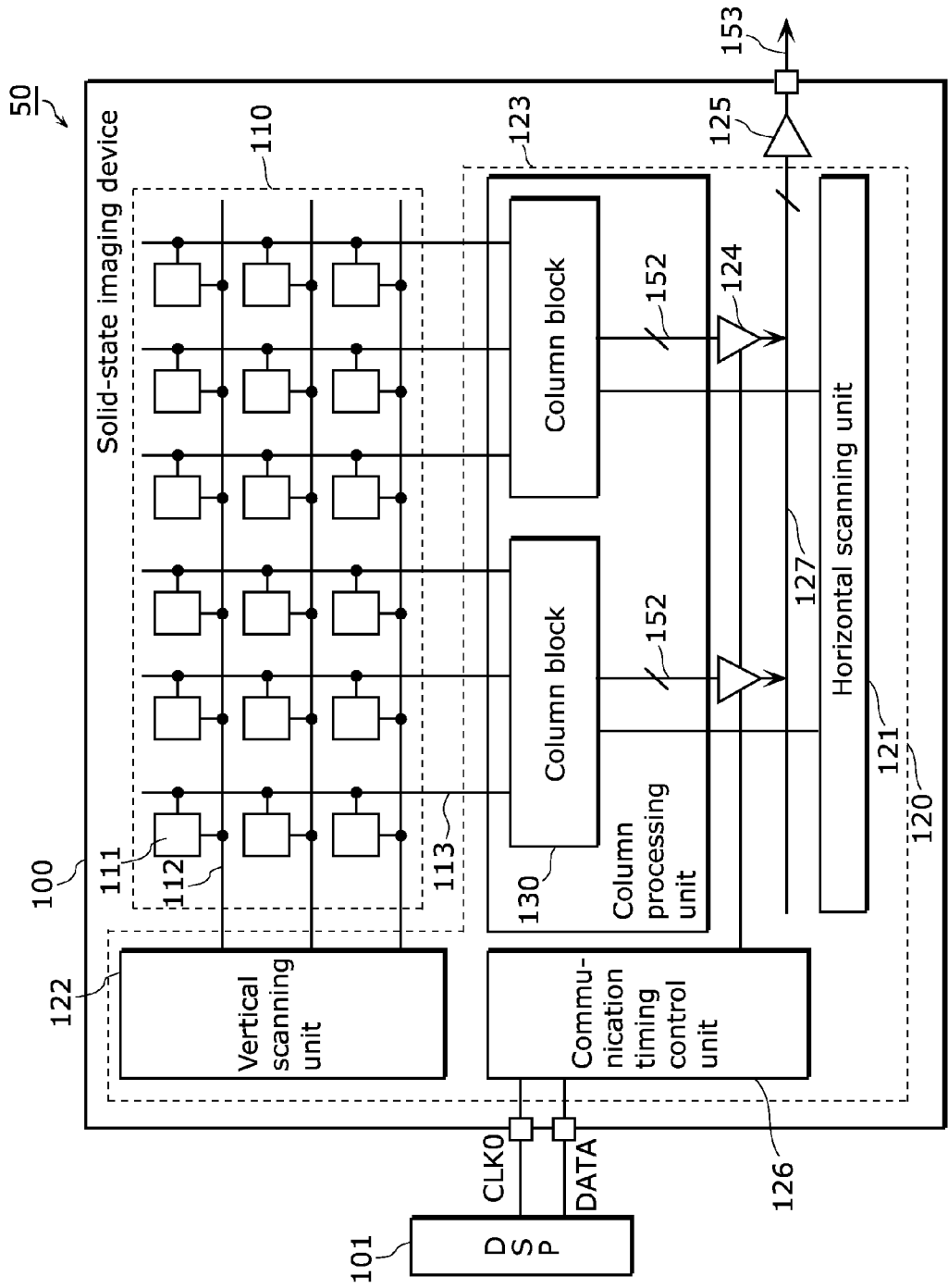
FIG. 1 is a block diagram showing a configuration of an imaging device according to a first embodiment of the present invention.

Hereafter, embodiments of the present invention will be described in details, referring to the drawings. The constituents given the same numeral in the drawings are configured to perform the same functions, and therefore the description of such constituents may be omitted.

The following embodiments represent preferred examples of the present invention. Constituents, positions thereof and relationships therebetween, processes, and sequences thereof described in the embodiments are merely exemplary, and in no way intended to limit the present invention. The present invention is solely limited by the appended claims. Therefore, the constituents described in the embodiments but not set forth in independent claims representing the most superordinate concept of the present invention are to be construed as optional constituents that are not mandatory, but that may achieve a more preferable form.

First Embodiment

A solid-state imaging device according to a first embodiment of the present invention is configured to perform a data capturing operation including storing digital data of N bits converted by an AD conversion unit in a data storage unit of the corresponding column, a horizontal shifting operation including serially connecting a plurality of data storage units, and a vertical shifting operation including serially connecting N flip-flop circuits included in each of the plurality of data storage units.

With those functions, the solid-state imaging device according to the first embodiment is capable of amplifying the digital data converted by the AD conversion unit without providing an additional circuit outside a column processing unit, and identifying a defective point in the data storage unit easily and quickly.

FIG. 1 is a block diagram showing a configuration of an imaging device 50 according to the first embodiment of the present invention.

The imaging device 50 shown in FIG. 1 includes the solid-state imaging device 100 and a digital signal processor (DSP) 101 which is an external system. The solid-state imaging device 100 includes a pixel array (imaging unit) 110 and a drive control unit 120 provided outside the pixel array 110.

The pixel array 110 converts incident light into a pixel signal. The pixel array 110 includes a plurality of unit pixels 111 arranged in a matrix pattern and a plurality of row control lines 112 each provided in a corresponding row, and a plurality of vertical signal lines 113 each provided in a corresponding column. The unit pixels 111 each convert incident light into a pixel signal according to a signal from the row control line 112 of the corresponding row, and output the converted pixel signal to the vertical signal line 113 of the corresponding column.

Although FIG. 1 shows the unit pixels 111 arranged in three rows by six columns in the pixel array 110 for the sake of clarity, the number of (rows and columns of) unit pixels 111 in the pixel array 110 may be different.

The drive control unit 120 drives the pixel array 110. The drive control unit 120 includes a horizontal scanning unit 121, a vertical scanning unit 122, a column processing unit 123, a plurality of output drivers 124, an output circuit 125, a communication timing control unit 126, and a horizontal signal line 127.

The horizontal scanning unit 121 controls column addresses and column scanning circuits.

The vertical scanning unit 122 controls row addresses and row scanning circuits.

The communication timing control unit 126 receives a master clock CLK0 from the DSP 101, and generates various internal clocks. The communication timing control unit 126 also controls the horizontal scanning unit 121, the vertical scanning unit 122, and the column processing unit 123. In addition, the communication timing control unit 126 receives data signal DATA from the DSP 101.

The column processing unit 123 converts a pixel signal 151 outputted from the pixel array 110 into digital data 152 of N bits.

The column processing unit 123 also includes a plurality of column blocks 130 respectively associated with column units including a predetermined number of columns. Although FIG. 1 shows the column units including three columns and two column blocks 130 in the column processing unit 123 for the sake of clarity, the number of columns in the column unit and the number of column blocks 130 may be different.

The column block 130 converts the pixel signal 151 of the associated column unit into the digital data 152 of N bits. The column block 130 also serially outputs the digital data 152 corresponding to the column unit.

The output drivers 124 are respectively associated with the column blocks 130. The output driver 124 outputs the digital data 152 outputted from the associated column block 130 to the horizontal signal line 127. Here, only one of the output drivers 124 outputs the digital data 152 to the horizontal signal line 127 according to a block selection signal 150 generated by the communication timing control unit 126. For example, when the data of an h-th column block 130 is to be outputted to the horizontal signal line 127, the communication timing control unit 126 sets the value of the block selection signal 150 as "h".

The output circuit 125 outputs the digital data 152 outputted by the output driver 124 to the horizontal signal line 127 to outside, as picture data 153.

Figure 2:
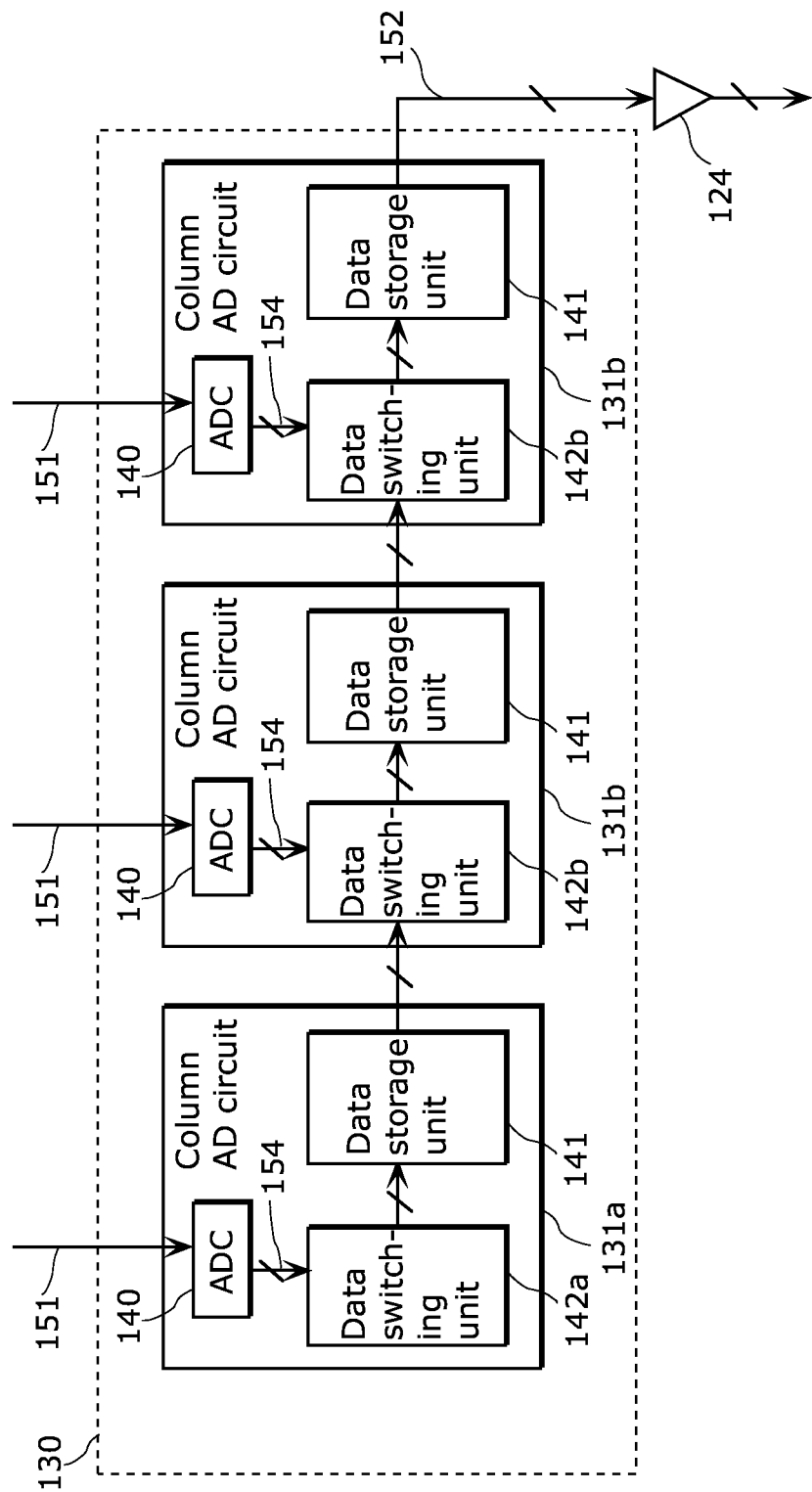
FIG. 2 is a block diagram showing a configuration of a column block according to the first embodiment of the present invention.

FIG. 2 is a block diagram showing a configuration of the column block 130.

As shown in FIG. 2, the column block 130 includes column analog/digital converter (hereinafter, column AD) circuits 131a and 131b each associated with one of the columns. Out of the column AD circuits in the column block 130, the column AD circuit 131a corresponds to a terminal (first) column, and the column AD circuits 131b respectively corresponds to the second and subsequent columns.

The column AD circuit 131a includes an AD conversion unit 140, a data storage unit 141, and a data switching unit 142a. The column AD circuits 131b each include an AD conversion unit 140, a data storage unit 141, and a data switching unit 142b.

The AD conversion unit 140 converts the pixel signal 151 converted by the unit pixels 111 located in the associated column into the digital data 154 of N bits.

The data storage unit 141 stores the digital data 154 of N bits converted by the AD conversion unit 140.

The data switching units 142a and 142b switch the data to be supplied to the data storage unit 141.

Figure 3:
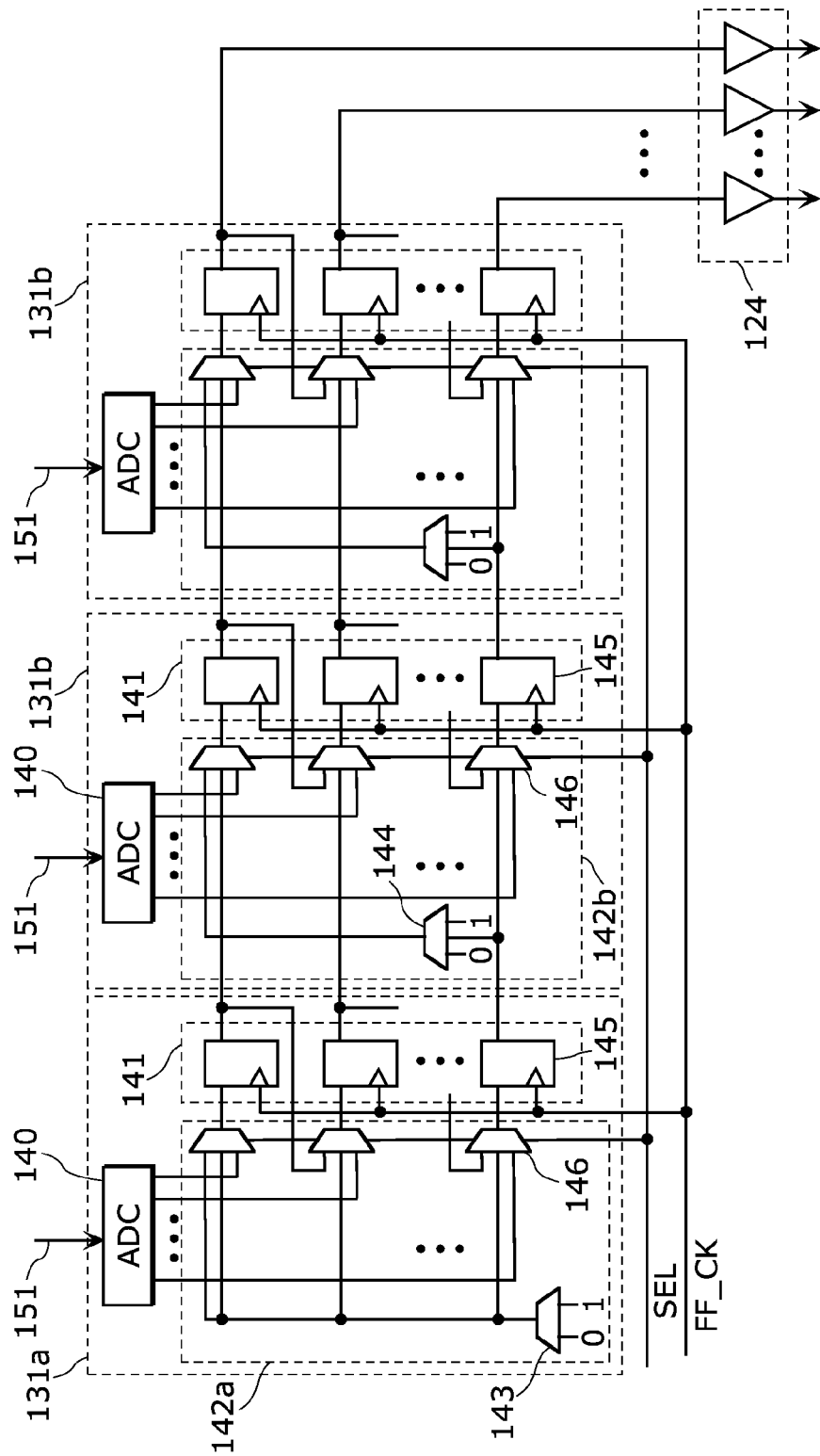
FIG. 3 is a circuit diagram of the column block according to the first embodiment of the present invention.

FIG. 3 is a circuit diagram showing a detailed configuration of the column block 130 and peripheral circuits.

As shown in FIG. 3, the data storage unit 141 includes N flip-flop circuits (FFs) 145 respectively corresponding to the bits of the digital data 154 of N bits of the associated column.

The data switching unit 142a includes N pieces of selectors 146 respectively corresponding to the FFs 145 of N bits, and a logic level switching unit 143.

The data switching unit 142b includes N pieces of selectors 146 respectively corresponding to the FFs 145 of N bits, and a shift data switching unit 144.

The selectors 146 each switch data to be inputted to the corresponding FF 145.

The logic level switching unit 143 switches data to be inputted to the N pieces of selectors 146 of the associated column.

The shift data switching unit 144 switches data to be inputted to a selector 146 of the lowest bit among the N pieces of selectors 146 of the associated column.

Hereunder, it will be assumed that the digital data 154 includes N bits; the column processing unit 123 includes h pieces of column blocks 130; and each of the column blocks 130 includes the column AD circuits 131a and 131b associated with three columns.

In addition, to distinguish among the column blocks 130, and the constituents and signals of each column block 130, the reference numerals or codes will be accompanied by numerals "_1" to "_h" for distinction of the corresponding block. Further, the constituents and signals associated with each column will be additionally accompanied with numerals "_1" to "_3" for distinction of the corresponding column. Still further, the constituents and signals corresponding to each bit will be additionally accompanied with numerals "_1" to "_N" for distinction of the corresponding bit. Accordingly, the imaging device 50 includes h×3×N of FFs 145 and selectors 146 in total.

Likewise, each of the output drivers 124 includes N pieces of drivers respectively corresponding to the N bits.

In the solid-state imaging device 100 thus configured, in each of the vertical columns the analog pixel signal 151 outputted by the unit pixel 111 is provided to the AD conversion unit 140 through the vertical signal line 113. Then the pixel signals 151 corresponding to one horizontal row are each converted simultaneously into the digital data 154 of N bits.

The digital data 154 is inputted to the data switching units 142a and 142b, and provided to the FF 145 through the selector 146, according to a control signal SEL provided by the communication timing control unit 20 at a predetermined timing.

The solid-state imaging device 100 according to this embodiment is configured to selectively perform data capturing, horizontal shifting, and vertical shifting, the details of which will be subsequently described.

The data capturing includes transferring the digital data 154 converted by the AD conversion unit 140 of each column to the data storage unit 141 of the same column. When the data capturing is performed, the data switching units 142a and 142b stores the digital data 154 of N bits converted by the AD conversion unit 140 in the data storage unit 141 of the same column (first state).

The horizontal shifting includes sequentially transferring (shifting) the data stored in the data storage unit 141 of each column in the horizontal direction (direction in which the columns are aligned). When the horizontal shifting is performed, the data switching units 142a and 142b in each of the column blocks 130 serially connect all the data storage units 141 in the same column block 130 (third state). In other words, the data switching units 142a and 142b serially connect a plurality of FFs 145 corresponding to the same bit, out of the FFs 145 included in the column block 130, with respect to each of the bits.

The vertical shifting includes sequentially transferring (shifting) the data retained by the FFs 145 corresponding to N bits in each column in the vertical direction (direction in which the bits are aligned). When the vertical shifting is performed, the data switching units 142a and 142b serially connect the N pieces of FFs 145 of each column (second state). Here, the data switching units 142a and 142b may serially connect the N pieces of FFs 145 of each single column, or serially connect all the FFs 145 included in the same column block 130, in each of the column blocks 130.

The logic level switching unit 143 and the shift data switching unit 144 selectively output a signal having a logical value of "0" or "1" to the FF 145 corresponding to the lowest bit through the selector 146 corresponding to the lowest bit, when the vertical shifting is performed.

The logic level switching unit 143 also selectively outputs a signal having a logical value of "0" or "1" to the data storage unit 141 associated with the first column through the data switching unit 142a associated with the first column, when the horizontal shifting is performed.

The output terminal of the data storage unit 141 of the last column, among the data storage units 141 included in the column block 130, is connected to the horizontal signal line 127 through the output driver 124. The horizontal signal line 127 has a width corresponding to N bits, which is the bit width of the column AD circuits 131a and 131b, and is connected to the output circuit 125.

With the aforementioned configuration, the solid-state imaging device 100 according to the first embodiment sequentially outputs the pixel signal 151 of each vertical column with respect to each row, from the pixel array 110 including photodetectors (unit pixels 111) arranged in the matrix pattern, the photodetectors serving as a charge generation unit. An image, i.e., a frame image is expressed as the aggregation of the pixel signals of the entire pixel array 110.

The logic level switching unit 143 provides a logic level to the FF 145 corresponding to the lowest bit of the first column of the column block 130. Further, the logic level switching unit 143 provides a logic level to the FFs 145 of the first column of the column block 130 respectively corresponding to the second to the N-th bits. Providing thus the logic level to the N pieces of FFs 145 from the single logic level switching unit 143 allows the circuit scale to be reduced.

The selectors 146 each include three input terminals and one output terminal. The selector 146 outputs the digital data 154 to the data storage unit 141 when the value of the control signal SEL is "0". Thus, the data storage unit 141 captures and retains the digital data 154 (data capturing).

When the value of the control signal SEL is "1", the selectors 146 of the second and subsequent columns each output the digital data retained by the FF 145 of the first preceding column, to the data storage unit 141 of the column associated with the selector 146. The selectors 146 of the first column each output the data outputted by the logic level switching unit 143 to the data storage unit 141 of the column associated with the selector 146. Thus, the data storage units 141 included in each column block 130 shift the respective retained data in the horizontal direction (horizontal shifting).

When the value of the control signal SEL is "2", the selectors 146 respectively corresponding to the second to the N-th bits each output the data retained by the FF 145 corresponding to the first lower bit of the same column, to the FF 145 corresponding to the same bit to which the selector 146 corresponds. The selector 146 corresponding to the lowest bit of the first column outputs the data outputted by the logic level switching unit 143 to the FF 145 corresponding to the same bit. The selectors 146 corresponding to the lowest bit of the second and subsequent columns each output the data outputted by the logic level switching unit 143 to the FF 145 corresponding to the same bit. Thus, the data storage units 141 shift the respective retained data in the vertical direction (vertical shifting).

Figure 4:
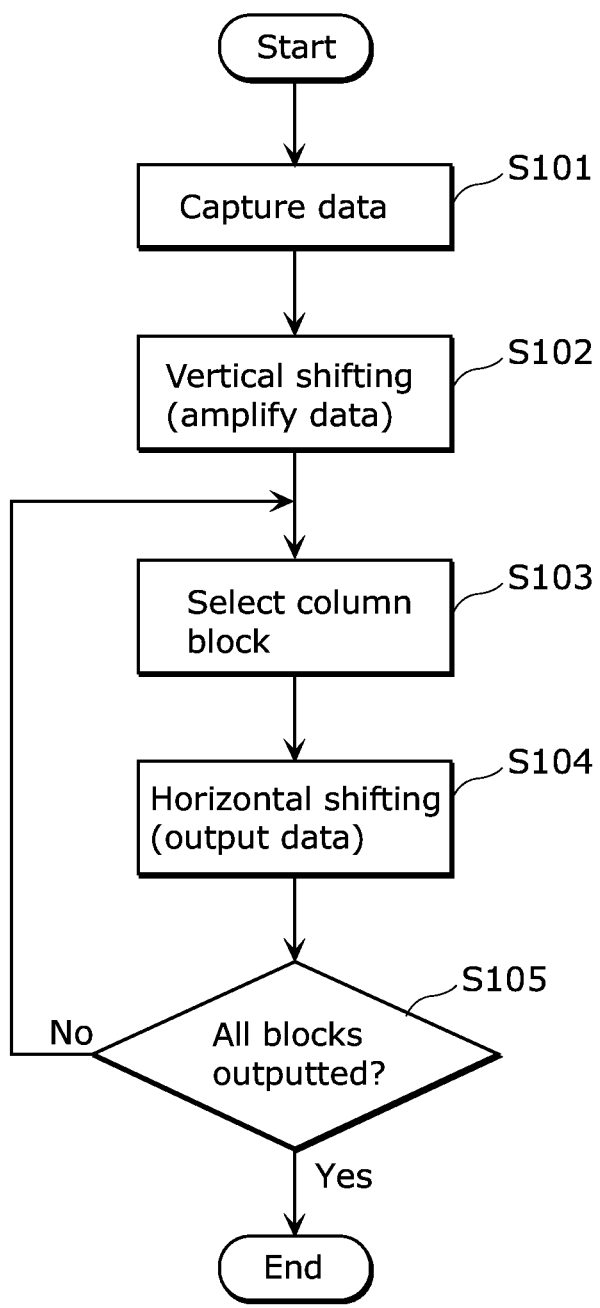
FIG. 4 is a flowchart showing a data amplification process performed by a solid-state imaging device according to the first embodiment of the present invention.
Figure 5:
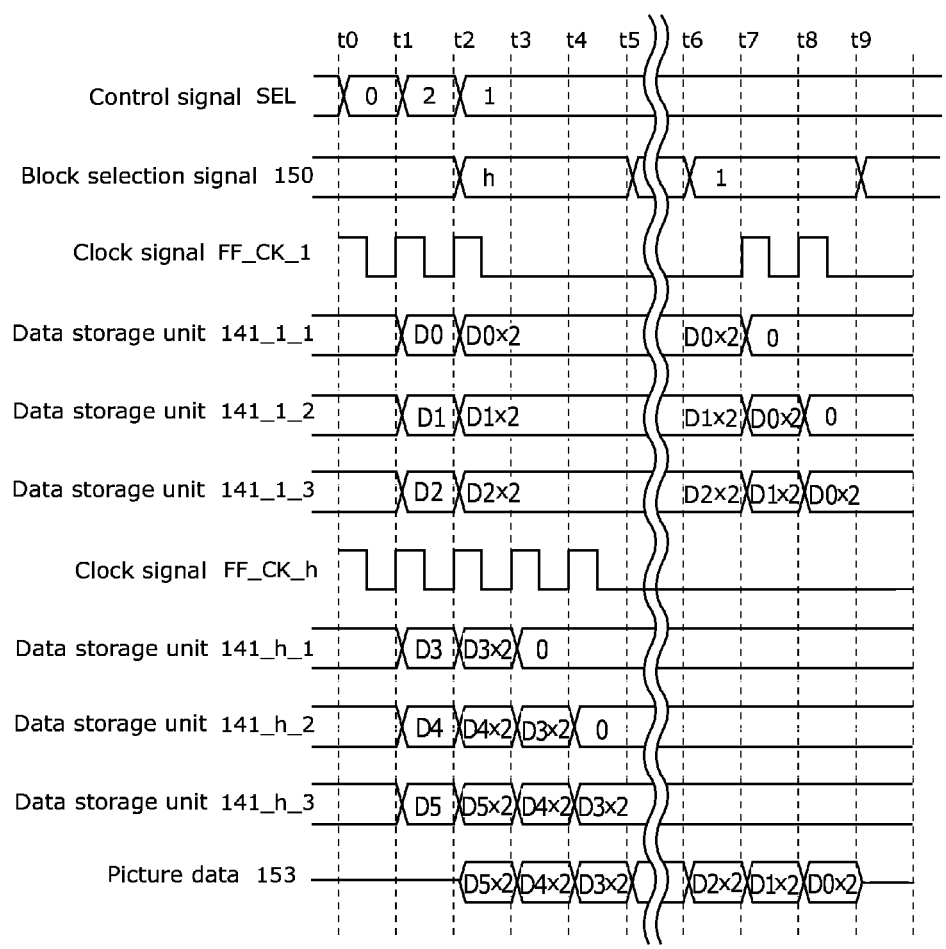
FIG. 5 is a timing chart of the data amplification process performed by the solid-state imaging device according to the first embodiment of the present invention.

FIG. 4 is a flowchart showing an amplification process of the digital data 154 performed by the solid-state imaging device 100. FIG. 5 is a timing chart of the same process. Referring now to FIGS. 4 and 5, an image outputting operation of the column processing unit 123 will be described hereunder.

First, the communication timing control unit 126 sets the data switching units 142a and 142b to the first state, and performs the data capturing, including storing the digital data 154 of each of the column in the data storage unit 141 (S101).

More specifically, the communication timing control unit 126 sets the control signal SEL as "0" to thereby cause the data switching units 142a and 142b to select the digital data 154, for a first reading (t0).

Then the communication timing control unit 126 inputs a pulse to the clock signal FF_CK to be provided to the FFs 145 of all the column blocks 130, to cause the FFs 145 to retain the digital data 154 outputted by the selector 146. Accordingly, the FFs 145 each capture and retain the digital data 154 outputted by the selector 146, in synchronization with the rising edge of the clock signal FF_CK. Therefore, the column AD circuits 131a to 131c output the data having the width of N bits respectively retained by the N pieces of FFs 145 (t1).

The communication timing control unit 126 then sets the data switching units 142a and 142b to the second state, and provides a clock to the FF 145. Accordingly, each bit of the digital data retained in the data storage unit 141 is shifted to the higher side. In other words, the data retained in the data storage units 141 is amplified (S102).

More specifically, at the time point t1 the communication timing control unit 126 sets the control signal SEL as "2", to cause the selector 146 to select the data retained by the FF 145 corresponding to the first lower bit of the same column (t1).

Further, the communication timing control unit 126 inputs a pulse to the clock signal FF_CK to be provided to the FFs 145 of all the column blocks 130, to cause the FFs 145 to retain the data outputted by the data switching units 142a and 142b. At this point, the selector 146 is outputting the data retained by the FF 145 corresponding to the first lower bit of the same column. Accordingly, the digital data is shifted to the higher bits (bit shifting). Thus, the digital data 154 of N bits outputted by the AD conversion unit 140 at the time point t0 is amplified (t2).

In this embodiment, since the FF 145 corresponding to the first lower bit is connected to the selector 146, the digital data 154 generated by the AD conversion unit 140 is doubled. In the case where the FF 145 corresponding to the second lower bit is connected to the selector 146, the digital data 154 generated by the AD conversion unit 140 is quadrupled. Thus, the extent of amplification can be adjusted by connecting the FFs 145 of the same column but corresponding to different lower bits, to the data switching units 142a and 142b.

The extent of amplification can also be adjusted by varying the number of pulses of the clock signal FF_CK to be inputted in the case where the selector 146 has selected the data retained by the FF 145 corresponding to the lower bit of the same column. For example, the digital data 154 can be shifted by two bits (quadrupled) by inputting the pulse twice.

Although the selector 146 includes three input terminals and one output terminal in this embodiment, the number of input terminals may be increased, and the input terminals may be connected to a plurality of FFs 145 corresponding to lower bits (for example, the first lower bit and the second lower bit) of the same column. In this case, the extent of amplification can also be adjusted by switching the control signal SEL.

To the selectors 146 corresponding to the lowest bits of the respective columns, the shift data switching unit 144 is connected, not the FF 145 corresponding to another bit of the same column. Accordingly, the shift data switching unit 144 can selectively input one of the logic level "0", the logic level "1", and the data retained by the FF 145 corresponding to the highest bit of another column, to the selector 146 corresponding to the lowest bit of the column associated with the shift data switching unit 144. Therefore, the value of the lowest bit of the data outputted by the column AD circuits 131a and 131b can be adjusted.

In addition, to the selector 146 corresponding to the lowest bit of the first column of each column block 130, the logic level switching unit 143 is connected, neither the FF 145 corresponding to another bit of the same column nor the FF 145 corresponding to the highest bit of another column.

Accordingly, the logic level switching unit 143 can selectively input the logic level "0" or "1", to the selector 146 corresponding to the lowest bit of the first column of the column block 130. Therefore, the value of the lowest bit of the data outputted by the column AD circuits 131a and 131b can be adjusted.

The communication timing control unit 126 then selects one of the plurality of column blocks 130, and causes the selected column block 130 to perform the horizontal shifting. As a result, the data retained in the selected column block 130 is sequentially outputted as the picture data 153 (S104).

More specifically, at the time point t2 the communication timing control unit 126 sets the control signal SEL as "1", to cause the data switching units 142a and 142b to select the data retained by the FF 145 of another column. Further, the communication timing control unit 126 sets the block selection signal 150 as "h", to output the data stored in the data storage units 141 of the column block 130_h to the horizontal signal line 127.

Then the communication timing control unit 126 inputs a pulse only to the clock signal FF_CK_h to be provided to the FFs 145 of the column block 130_h, and detains the clock signal FF_CK to be provided to the remaining column blocks 130 (t3).

In addition, the communication timing control unit 126 inputs a necessary number of pulses for outputting all the data stored in the data storage units 141 of the column block 130_h, to the clock signal FF_CK_h (t4).

After all the data retained in the data storage units 141 of the column block 130_h has been outputted, the communication timing control unit 126 selects the column block 130_h−1 (S103) because the data of all the column blocks 130 has not yet been outputted (No at S105), to cause the selected column block 130_h−1 to perform the horizontal shifting (S104).

More specifically, the communication timing control unit 126 sets the block selection signal 150 as "h−1", and inputs a pulse only to the clock signal FF_CK_h−1 to be provided to the FFs 145 of the column block 130_h−1 and detains the clock signal FF_CK to be provided to the remaining column blocks 130, to output the data stored in the data storage units 141 of the next column block 130_h−1 to the horizontal signal line 127.

Further, the communication timing control unit 126 repeats the foregoing process (t5 to t9) until the data stored in the data storage units 141 of all the column blocks 130 is outputted to the horizontal signal line 127 (Yes at S105).

As described above, the solid-state imaging device 100 according to the first embodiment is capable of amplifying the data from the AD conversion unit 140, without the need to employ an additional circuit outside the column processing unit 123.

Now, a defect detection process performed by the solid-state imaging device 100 according to the first embodiment will be described hereunder.

Figure 6:
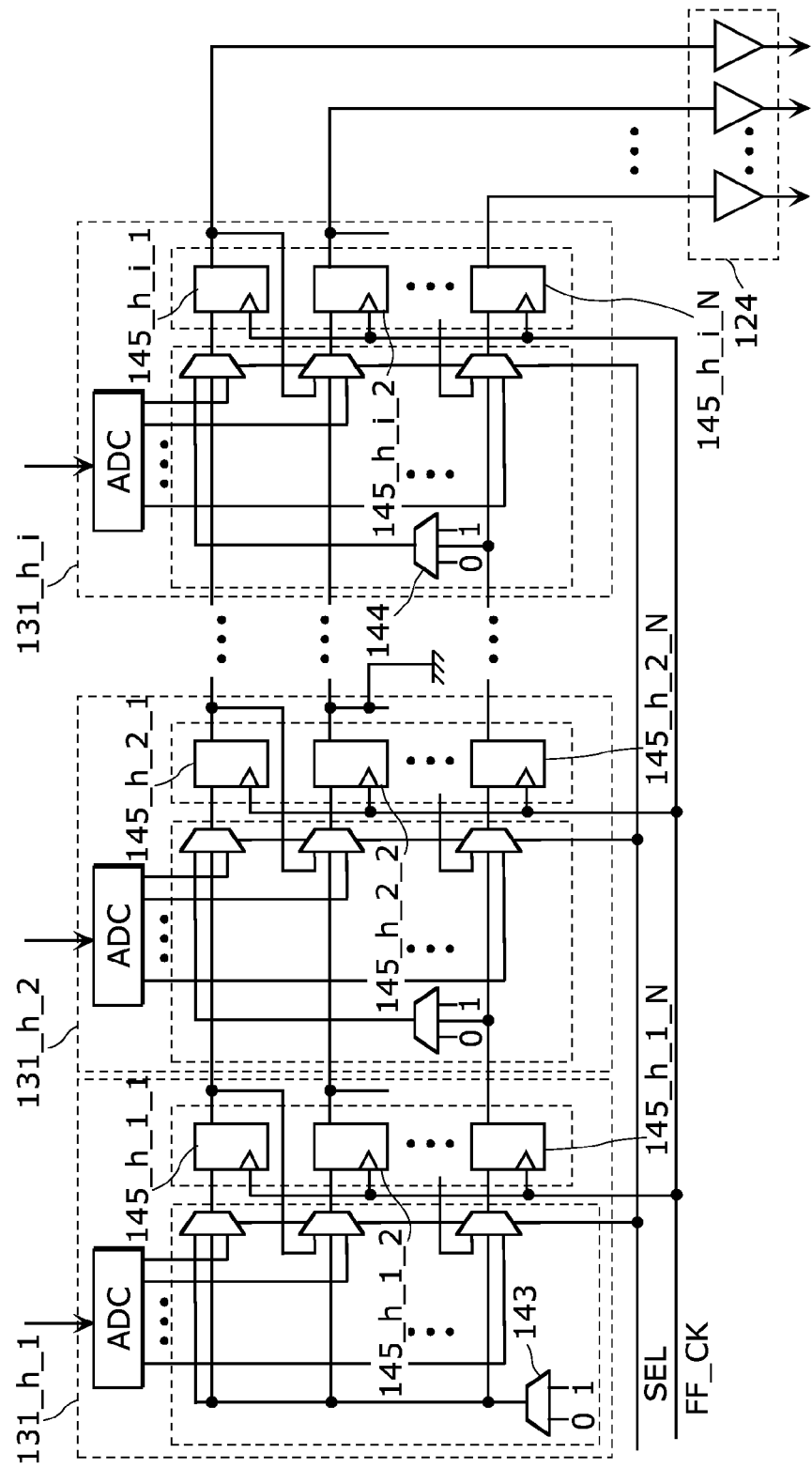
FIG. 6 is a circuit diagram showing the column block with a defect, according to the first embodiment of the present invention.

FIG. 6 is a circuit diagram showing the column block 130, in which the output terminal of the FF 145_h_2_2 of the column block 130_h is short-circuited to GND. In FIG. 6, the column block 130 includes i pieces of column AD circuits 131a and 131b.

A first defect detection is performed as follows. The solid-state imaging device 100 outputs data for identifying the bit corresponding to the defective circuit by the first defect detection.

Figure 7:
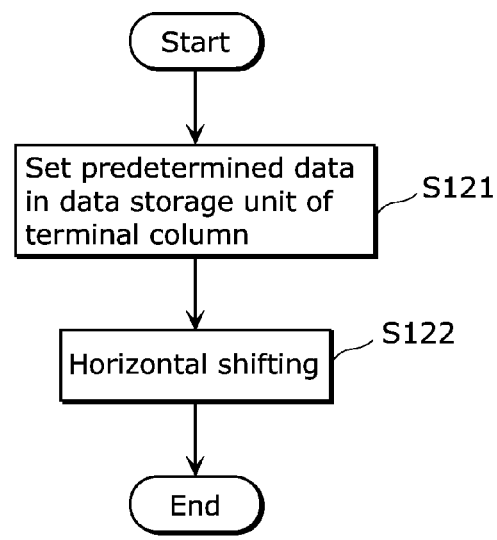
FIG. 7 is a flowchart showing a first defect detection process performed by the solid-state imaging device according to the first embodiment of the present invention.

FIG. 7 is a flowchart showing the first defect detection process performed by the solid-state imaging device 100.

Figure 8:
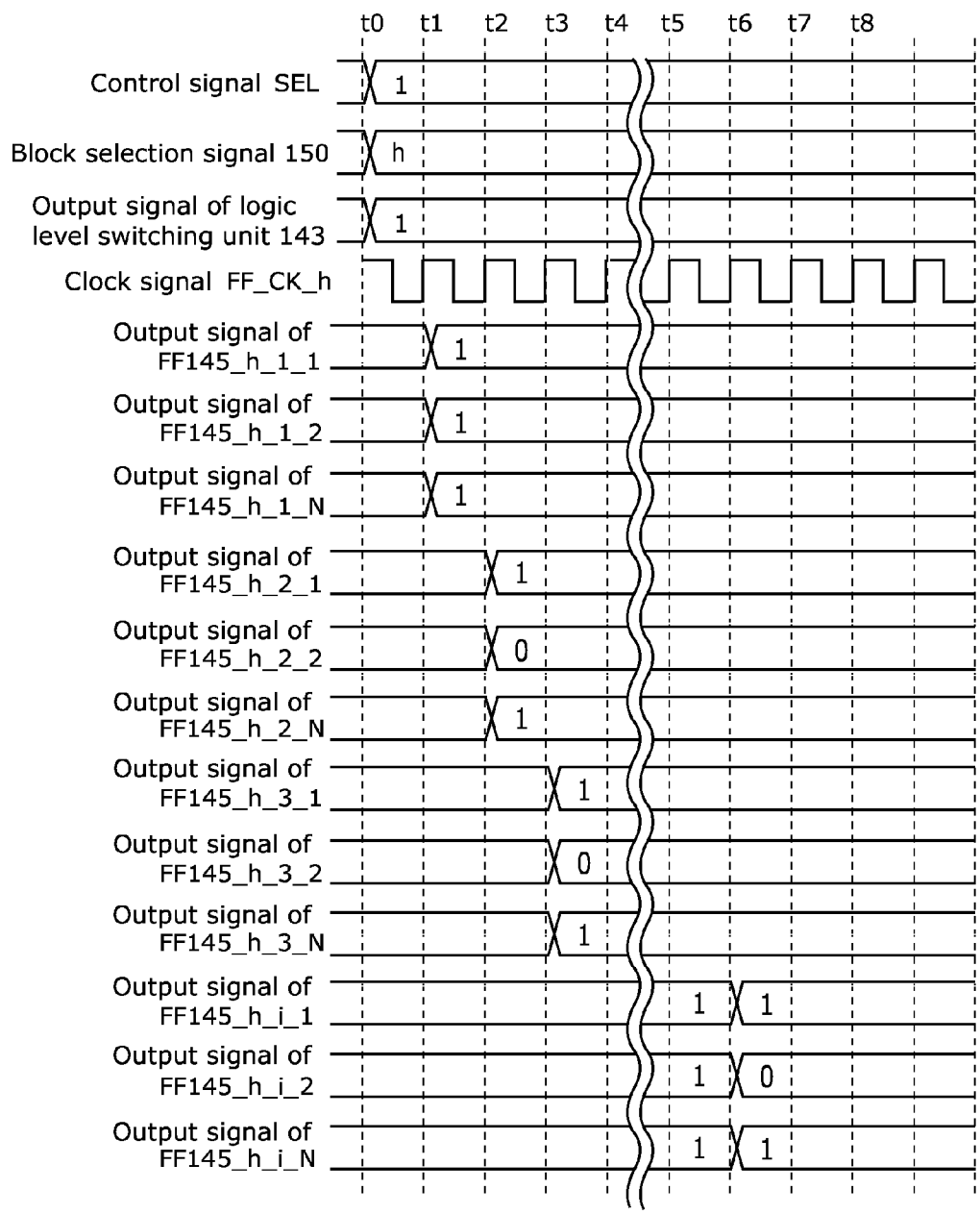
FIG. 8 is a timing chart of the first defect detection process performed by the solid-state imaging device according to the first embodiment of the present invention.

FIG. 8 is a timing chart of the first defect detection for identifying the defective point shown in FIG. 6.

First, the communication timing control unit 126 sets predetermined data (in this example, value "1") in the data storage unit 141 of the first column (S121).

More specifically, as shown in FIG. 8, the communication timing control unit 126 sets the block selection signal 150 as "h" to output the data of the column block 130_h to the horizontal signal line 127, in order to inspect the column block 130_h. The communication timing control unit 126 also sets the output signal of the logic level switching unit 143 as "1". Further, the communication timing control unit 126 sets the control signal SEL as "1" to cause the data switching units 142a and 142b to select the output signal from the logic level switching unit 143 (t0).

Then the communication timing control unit 126 inputs a pulse to the clock signal FF_CK_h to cause the data storage unit 141_h_1 of the first column to capture and retain the output signal from the logic level switching unit 143 (t1).

The communication timing control unit 126 then causes a plurality of data storage units 141 to perform the horizontal shifting (S122).

More specifically, the communication timing control unit 126 inputs a pulse to the clock signal FF_CK_h to cause the data storage unit 141_h_2 of the second column to capture and retain the output signal from the data storage unit 141_h_1 of the first column (t2).

Then the communication timing control unit 126 inputs a pulse to the clock signal FF_CK_h to cause the data storage unit 141_h_3 of the third column to capture and retain the output signal from the data storage unit 141_h_2 of the second column. At this point, the FF 145_h_3_2 attempts to capture the value "1" retained by the FF 145_h_2_2, however since the output terminal of the FF 145_h_2_2 is short-circuited to GND, the output signal of FF 145_h_3_2 becomes "0" (t3).

Thereafter, the horizontal shifting is repeated until the data is propagated to the data storage unit 141_h_i of the i-th column (t4 to t6).

As a result of the data propagation as far as the i-th column of the last stage, the defective output of the FF 145_h_2_2 is also propagated and the output signal of the FF 145_h_i_2 of the last stage becomes "0". Accordingly, an external device or an operator is led to decide that the FF 145 corresponding to the second bit of one of the columns in the column block 130_h is defective.

Figure 9:
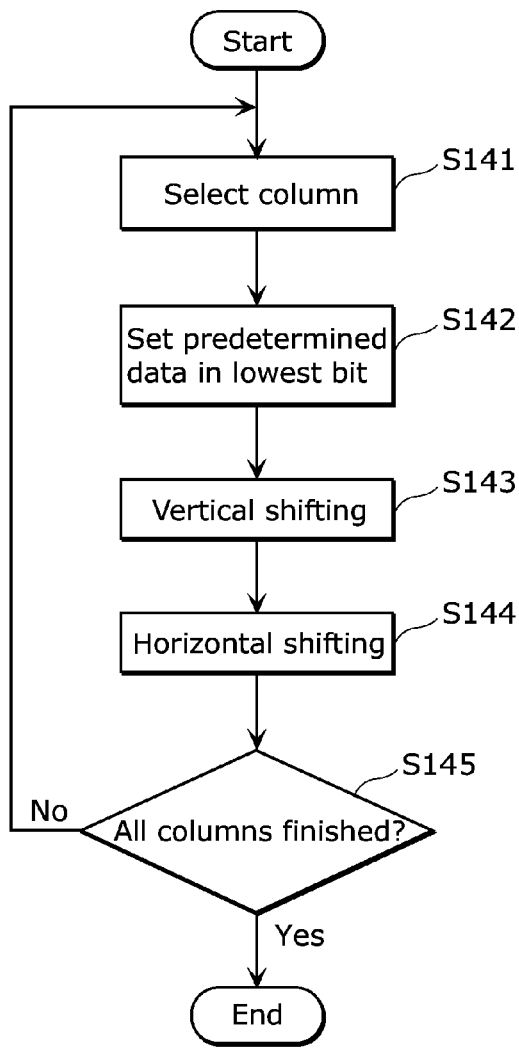
FIG. 9 is a flowchart showing a second defect detection process performed by the solid-state imaging device according to the first embodiment of the present invention.
Figure 10:
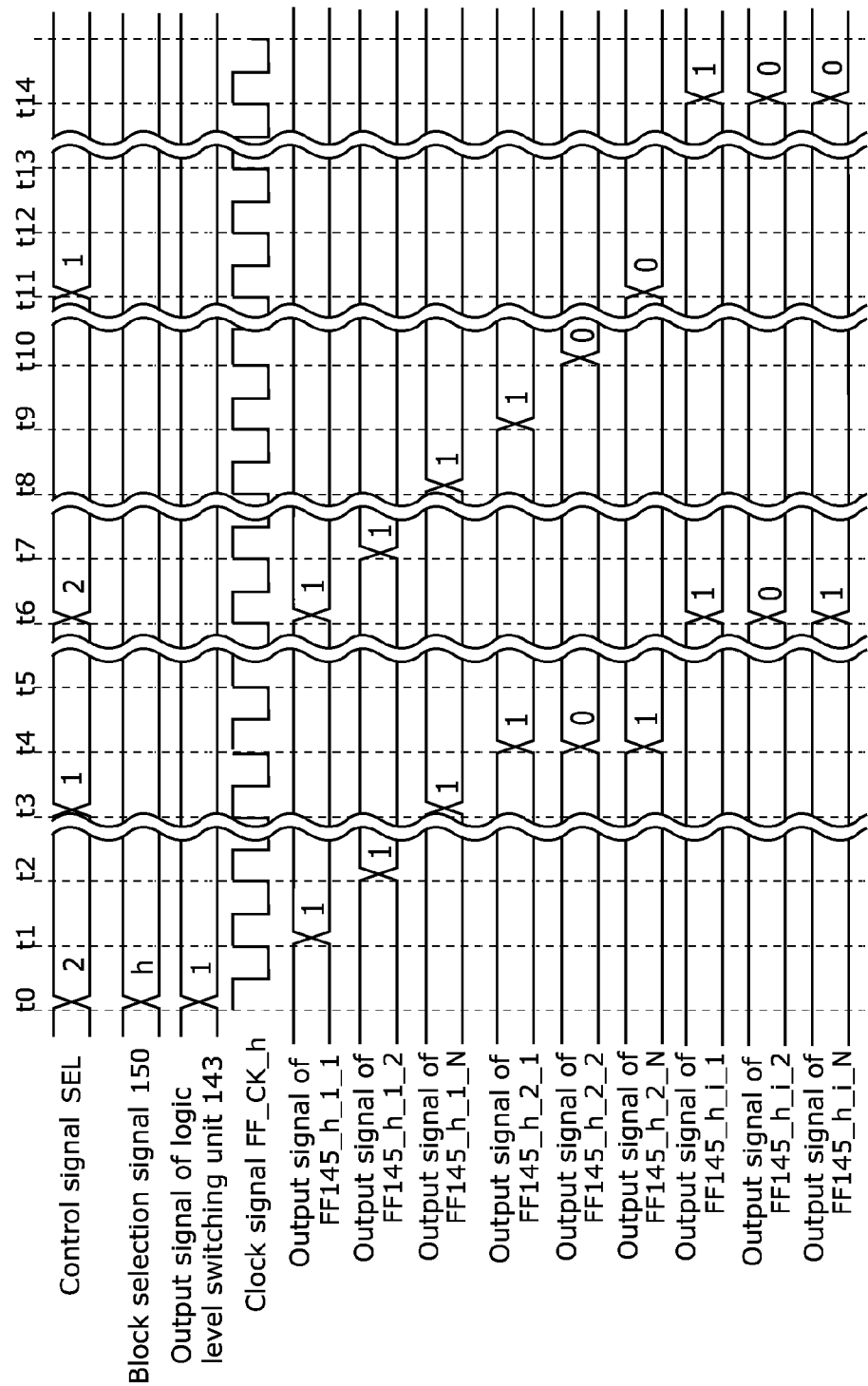
FIG. 10 is a timing chart of the second defect detection process performed by the solid-state imaging device according to the first embodiment of the present invention.

Referring now to FIGS. 9 and 10, description will be given on a second defect detection process for identifying the column that includes the defective circuit.

FIG. 9 is a flowchart showing the second defect detection process performed by the solid-state imaging device 100. FIG. 10 is a timing chart of the second defect detection for identifying the defective point shown in FIG. 6.

First, the communication timing control unit 126 selects the first column (S141).

Then the communication timing control unit 126 sets predetermined data (in this example, value "1") in the FF 145 corresponding to the lowest bit of the first column selected (S142).

More specifically, as shown in FIG. 10, the communication timing control unit 126 sets the block selection signal 150 as "h" to output the data of the column block 130_h to the horizontal signal line 127, in order to inspect the column block 130_h. The communication timing control unit 126 also sets the output signal of the logic level switching unit 143 as "1", to set "1" in the FF 145_h_1_1 of the first column. Further, the communication timing control unit 126 sets the control signal SEL as "2" to cause the data storage unit 141 to perform the vertical shifting (t0).

The communication timing control unit 126 then inputs a pulse to the clock signal FF_CK_*h* to cause the FF 145_*h*_1_1 of the first column to capture and retain the output signal from the logic level switching unit 143 (t1).

Thereafter, the solid-state imaging device 100 performs the vertical shifting (S143).

More specifically, the communication timing control unit 126 inputs pulses to the clock signal FF_CK_*h* until the value retained by the FF 145_*h*_2_1 is propagated to the FFs 145_*h*_1_2 to 145_*h*_1_N. Accordingly, the FF 145_*h*_1_1 to FF 145_*h*_1_N perform the vertical shifting (t2 to t3).

Then the solid-state imaging device 100 performs the horizontal shifting (S144).

More specifically, at the time point t3 the communication timing control unit 126 sets the control signal SEL as "1" to transfer the data retained by the FF 145_*h*_1_1 to FF 145_1_2_N of the first column in the horizontal direction.

Then the communication timing control unit 126 repeats the horizontal shifting until the data is propagated from the FFs 145_*h*_2_1 to 145_*h*_2_N of the second column to the FFs 145_*h*_*i*_1 to 145_*h*_*i*_N of the i-th column (t4 to t6).

As a result, only the output signal of the FF 145_*h*_*i*_2, out of the output signals of the FF 145_*h*_*i*_1 to FF 145_*h*_*i*_N of the i-th column of the last stage, becomes "0" because the defective output of the FF 145_*h*_2_2 has propagated. Now, in the case where the defect lies in the FF 145_1_2 of the first column selected at the step S141, the defect is propagated by the vertical shifting of the step S143 and the FF 145_*h*_1_3 to FF 145_*h*_1_N capture and retain "0". Further, such data is transferred by the horizontal shifting of the step S144, and hence the outputs of the FF 145_*h*_*i*_2 to FF 145_*h*_*i*_N are supposed to be "0".

Thus, through the operation from the time point t0 to the time point t6, it is decided that the data storage units 141 included in the column AD circuit 131_*h*_1 do not include a defect (short circuit with GND).

Since the detection has not been performed with respect to all the columns (No at S145), the communication timing control unit 126 then selects the second column (S141).

The communication timing control unit 126 sets predetermined data (in this example, value "1") in the FF 145_*h*_2_1 corresponding to the lowest bit of the second column selected (S142).

The solid-state imaging device 100 performs the vertical shifting (S143).

More specifically, the communication timing control unit 126 inputs pulses to the clock signal FF_CK_*h* until the value retained by the FF 145_*h*_1_1 is propagated to FFs 145_*h*_2_2 to 145_*h*_2_N of the second column, thus performing the vertical shifting (t6 to t11).

Then the solid-state imaging device 100 performs the horizontal shifting (S144).

More specifically, the communication timing control unit 126 repeats the horizontal shifting until the data of the second column is propagated to the FF 145_*h*_*i*_1 to FF 145_*h*_*i*_N of the i-th column (t12 to t14).

As a result, the defective output of the FF 145_2_2 of the second column is propagated by the vertical shifting of the step S143 to the FF 145_*h*_2_3 to FF 145_*h*_2_N, and hence the FF 145_2_3 to FF 145_2_N capture and retain "0". Further, such data is propagated by the horizontal shifting of the step S144, and hence the output signals of the FF 145_*i*_2 to FF 145_*i*_N become "0".

As described above, sequentially selecting all the columns and confirming the propagation of the defective data in the vertical direction with respect to each of the selected columns enables the column that includes the defective circuit to be identified.

In addition, performing the first defect detection shown in FIG. 7 and the second defect detection shown in FIG. 9 with respect to all the column blocks 130 enables the defective point in the data storage unit 141 to be easily and quickly identified.

Regarding a short circuit with the power source, the short-circuited point can also be identified by performing similar detection upon setting the output signal of the logic level switching unit 143 as "0".

The communication timing control unit 126 may provide the clock signal FF_CK of a first frequency to the plurality of FFs 145 in the data capturing process, and provide the clock signal FF_CK of a second frequency lower than the first frequency, in the vertical shifting process. Such an arrangement mitigates restriction on the wiring layout, in the case where the clock frequency for performing a normal operation (data capturing) is high and hence the freedom in designing the wiring for performing the vertical shifting is restricted.

Further, the communication timing control unit 126 may provide the clock signal FF_CK of the first frequency to the plurality of FFs 145 in the horizontal shifting process. In this case, not only a stuck-at fault but also a delay fault in the data storage unit 141 can be detected.

In the case where the clock frequency for the normal operation is low and the shifting in the vertical direction can be performed at the clock frequency of the normal operation, both of the shifting in the horizontal direction and the shifting in the vertical direction may be performed at the clock frequency of the normal operation. Such an arrangement enables the detection time to be shortened, and also enables not only a stuck-at fault but also a delay fault in the data storage unit to be detected.

The defect of the FF 145_*h*_2_2 of the second column is merely an example, and the defective point of all the FFs 145 can be easily and quickly identified through the aforementioned process.

Second Embodiment

Figure 11:
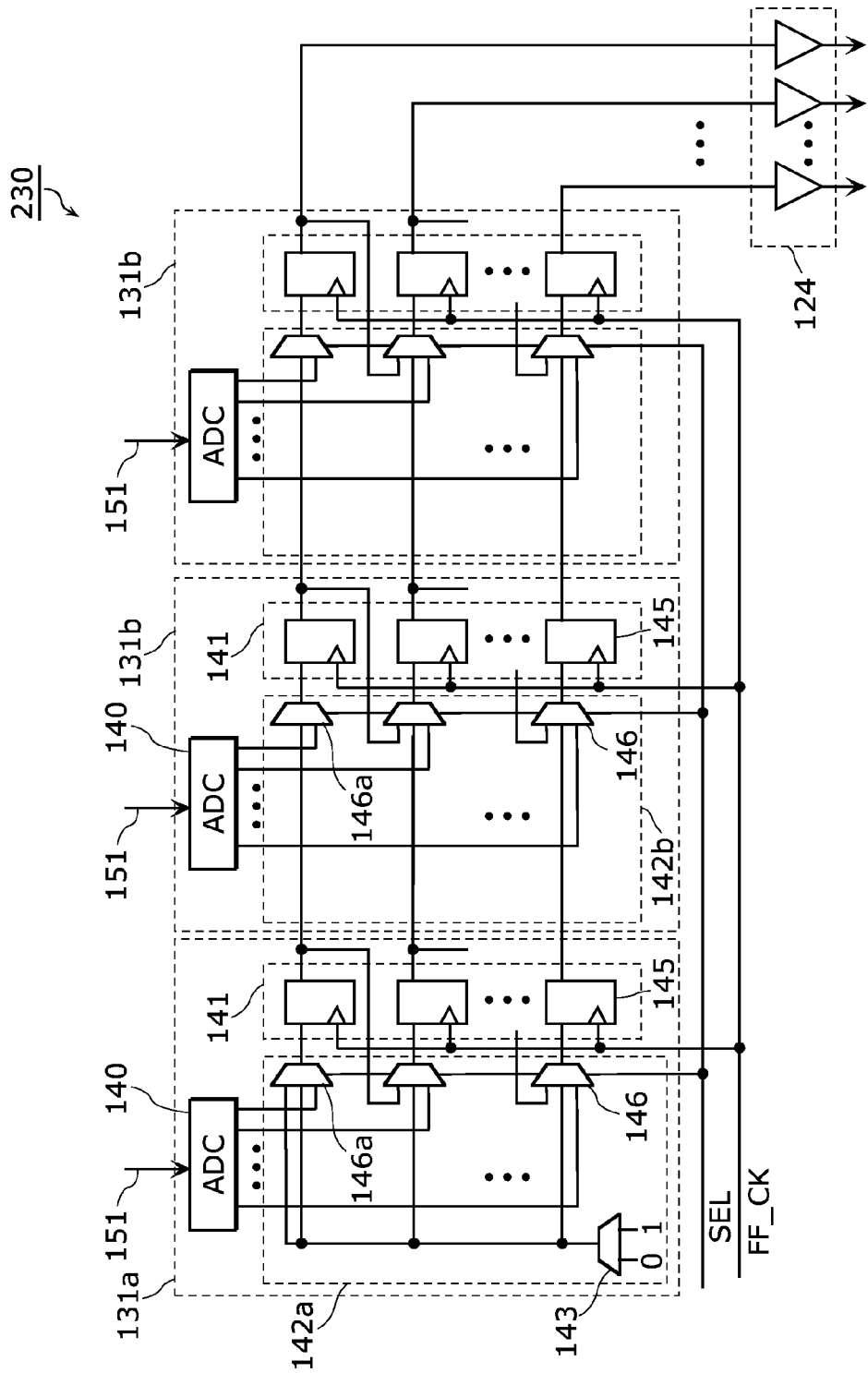
FIG. 11 is a circuit diagram showing a configuration of a column block according to a second embodiment of the present invention.

FIG. 11 is a circuit diagram showing a detailed configuration of a column block 230 and peripheral circuits according to a second embodiment of the present invention. The majority of the configuration shown in FIG. 11 is the same as that of FIG. 3, and therefore differences will be primarily described hereunder.

The column block 130 shown in FIG. 11 is primarily intended to identify a defective point in the data storage unit 141 easily and quickly, for which the selector 146*a* connected to the FF 145 corresponding to the lowest bit has only two input terminals. In other words, only the data for the normal operation is inputted to the selector 146*a*. In addition, the column AD circuits 131*b* of the second and subsequent columns do not include the shift data switching unit 144.

With such a configuration, the selector 146 corresponding to the lowest bit of the first column selects the output signal of the logic level switching unit 143, and the selectors 146 corresponding to the lowest bits of the second and subsequent columns each select the data retained by the FF 145 corresponding to the same bit of the first preceding column, in the vertical shifting process. Thus, in the vertical shifting process the data switching units 142*a* and 142*b* serially connect the FFs 145 in the same sequence as in the horizontal shifting process.

Such an arrangement allows the circuit scale of the data switching units 142a and 142b, as well as the number of wirings, to be reduced.

The solid-state imaging device 100 according to the second embodiment performs in the same way as in the first embodiment, i.e., performs the first defect detection process shown in FIG. 7 and the second defect detection process shown in FIG. 9, to thereby identify a defective point in the data storage unit 141 easily and quickly.

As described above, in the solid-state imaging device 100 according to the second embodiment, the FFs 145 corresponding to the lowest bit perform the same shifting operation as in the normal operation, in the detection process. Such an arrangement contributes to reducing the circuit scale.

Third Embodiment

Figure 12:
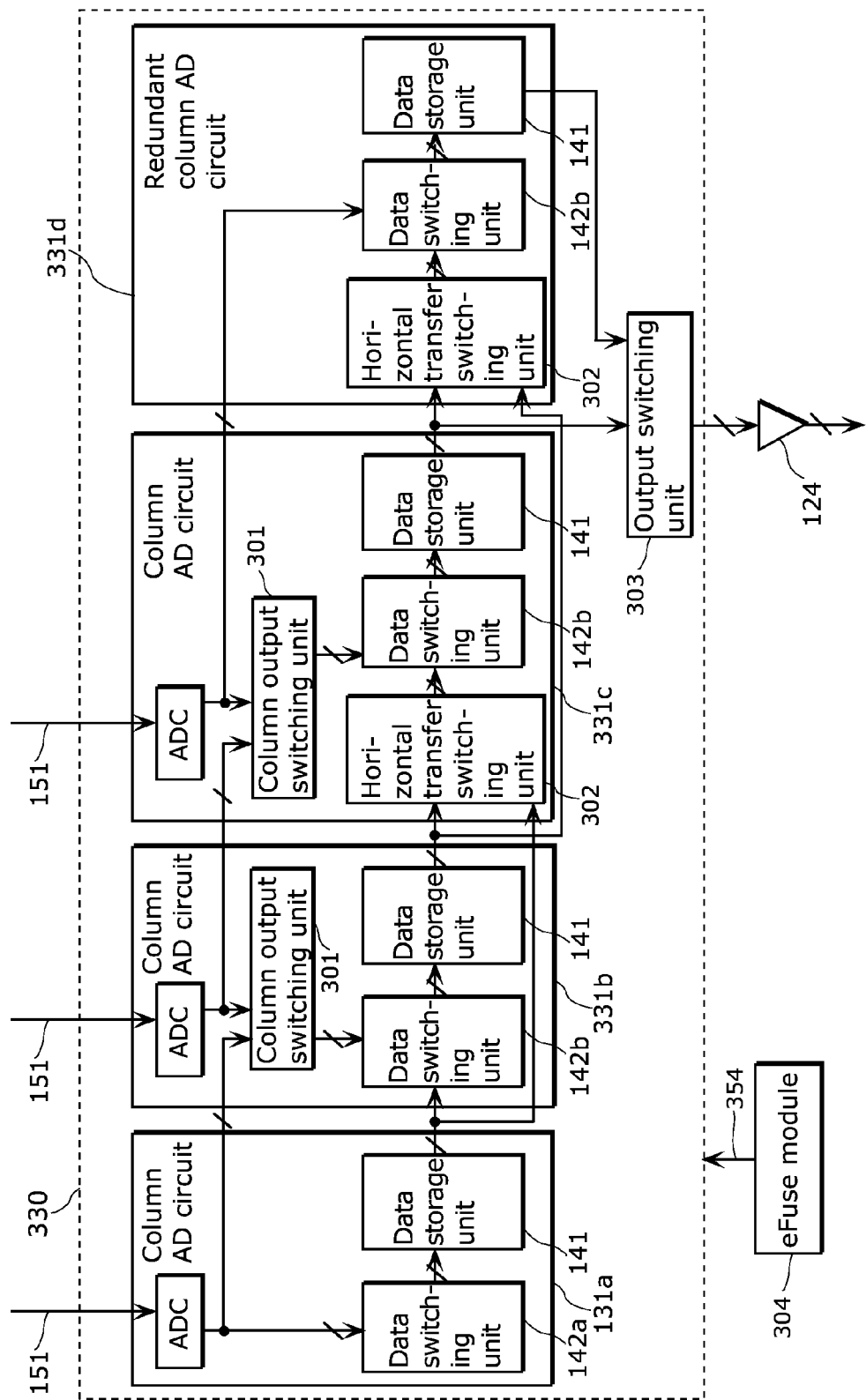
FIG. 12 is a block diagram showing a configuration of a column block according to a third embodiment of the present invention.

FIG. 12 is a block diagram showing a configuration of a column block 330 according to a third embodiment of the present invention. The majority of the configuration shown in FIG. 12 is the same as that of FIG. 2, and therefore differences will be primarily described hereunder.

The column block 330 according to the third embodiment is capable of replacing a data storage unit 141 in which a defect has arisen with a normal data storage unit 141.

The column block 330 shown in FIG. 12 includes a redundant column AD circuit 331d and an output switching unit 303, in addition to the constituents of the column block 130 shown in FIG. 2. Further, the configuration of the column AD circuit 331b of the second column and that of the column AD circuit 331c of the third and subsequent columns are different from that of the column AD circuit 131b.

The solid-state imaging device 100 according to the third embodiment also includes an eFuse module 304.

Although each column block 330 includes three columns in this embodiment for the sake of clarity, the number of columns may be different.

The column blocks 330 each include the same number of column AD circuits 131a, 331b, and 331c as the number of corresponding pixel columns (three columns in this embodiment) in the pixel array 110. Each column block 330 also includes the redundant column AD circuit 331d to be replaced for a defective circuit.

The configuration of the column AD circuit 131a of the first column is the same as that of the first embodiment.

The column AD circuit 331b of the second column includes the column output switching unit 301, in addition to the configuration of the column AD circuit 131b.

The column output switching unit 301 selects one of the digital data 154 generated by the AD conversion unit 140 of the same column and the digital data 154 generated by the AD conversion unit 140 of the first preceding column, and outputs the selected digital data 154 to the data switching unit 142b of the column associated with the column output switching unit 301.

The column AD circuits 331c of the third and subsequent columns each include a horizontal transfer switching unit 302, in addition to the configuration of the column AD circuit 331b.

The horizontal transfer switching unit 302 selects one of the data stored in the data storage unit 141 of the first preceding column and the data stored in the data storage unit 141 of the second preceding column, and outputs the selected data to the data switching unit 142b of the column with which the horizontal transfer switching unit 302 is associated.

The redundant column AD circuit 331d includes a data switching unit 142b, a data storage unit 141, and a horizontal transfer switching unit 302.

The output switching unit 303 selects one of the data stored in the data storage unit 141 of the column AD circuit 331c of the last column and the data stored in the data storage unit 141 of the redundant column AD circuit 331d, and outputs the selected data to the output driver 124.

Figure 13A:
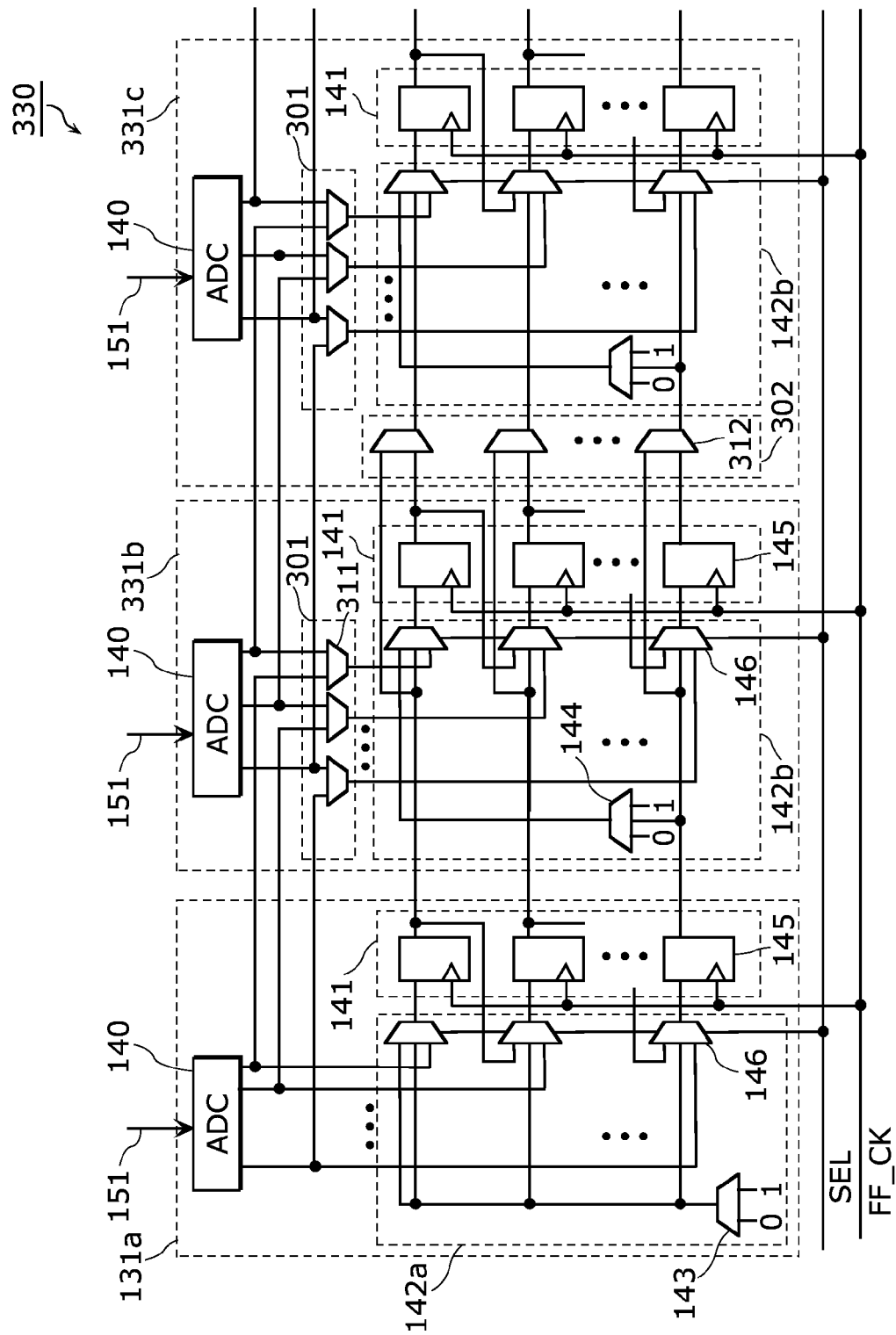
FIG. 13A is a circuit diagram of the column block according to the third embodiment of the present invention.
Figure 13B:
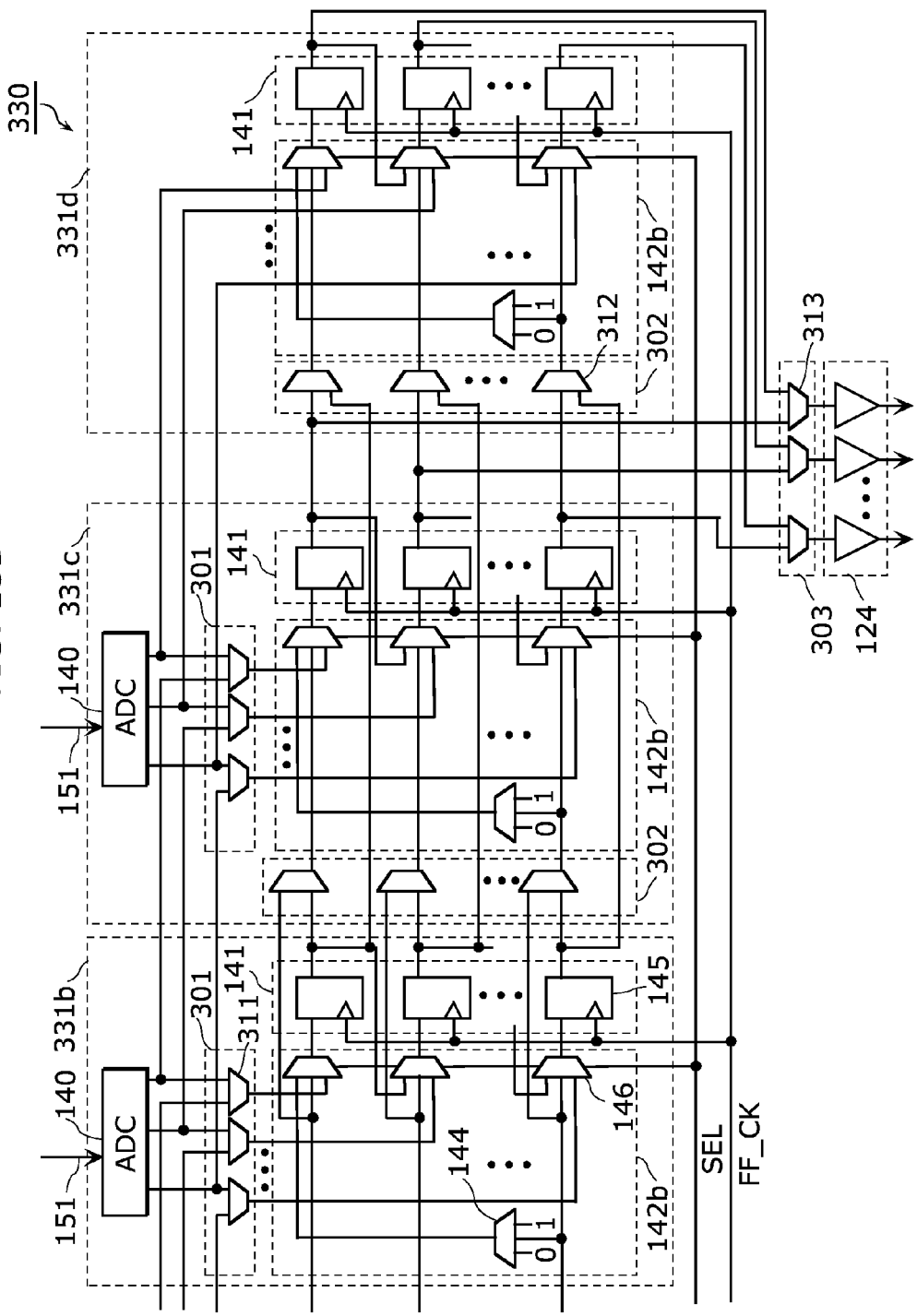
FIG. 13B is another circuit diagram of the column block according to the third embodiment of the present invention.

FIGS. 13A and 13B are circuit diagrams of the column block 330 and peripheral circuits according to the third embodiment, FIG. 13A showing a detailed configuration of the column AD circuits 131a, 331b, and 331c, and FIG. 13B showing a detailed configuration of the column AD circuits 331b, 331c, and 331d.

The column output switching unit 301 includes N pieces of selectors 311 respectively corresponding to the bits of the digital data 154 of N bits.

The selectors 311 each select one of the data of the corresponding bit of the digital data 154 generated by the AD conversion unit 140 of the same column and the data of the corresponding bit of the digital data 154 generated by the AD conversion unit 140 of the first preceding column, and outputs the selected data to the selector 146 corresponding to the same bit of the column associated with the selector 311.

The horizontal transfer switching unit 302 includes N pieces of selectors 312 respectively corresponding to the bits of the N bits.

The selectors 312 each select one of the data retained by the FF 145 corresponding to the same bit of the first preceding column and the data retained by the FF 145 corresponding to the same bit of the second preceding column, and outputs the selected data to the selector 146 corresponding to the same bit of the column associated with the selector 312.

Thus, the selectors 146 of the second, the third, and the subsequent columns select the data selected by the respective selectors 311 corresponding to the same bit, in the data capturing process.

The selectors 146 of the third and subsequent columns select the data selected by the respective selectors 312 corresponding to the same bit, in the horizontal shifting process.

The output switching unit 303 includes N pieces of selectors 313 respectively corresponding to the bits of the N bits.

The selectors 313 each select one of the data retained by the FF 145 corresponding to the same bit in the column AD circuit 331c of the last column and the data retained by the FF 145 corresponding to the same bit in the redundant column AD circuit 331d, and outputs the selected data to the output driver 124.

The eFuse module 304 retains defect information 354 indicating whether a defective circuit is present, and the data storage unit 141 of which column out of the plurality of data storage units 141 includes the defective circuit.

Here, the column output switching unit 301, the horizontal transfer switching unit 30, and the output switching unit 303 correspond to the redundant switching unit according to the present invention, and serves to replace the data storage unit 141 indicated by the defect information 354 with the data storage unit 141 of the redundant column AD circuit 331d.

An operation of the solid-state imaging device 100 according to the third embodiment will now be described hereunder.

Figure 14A:
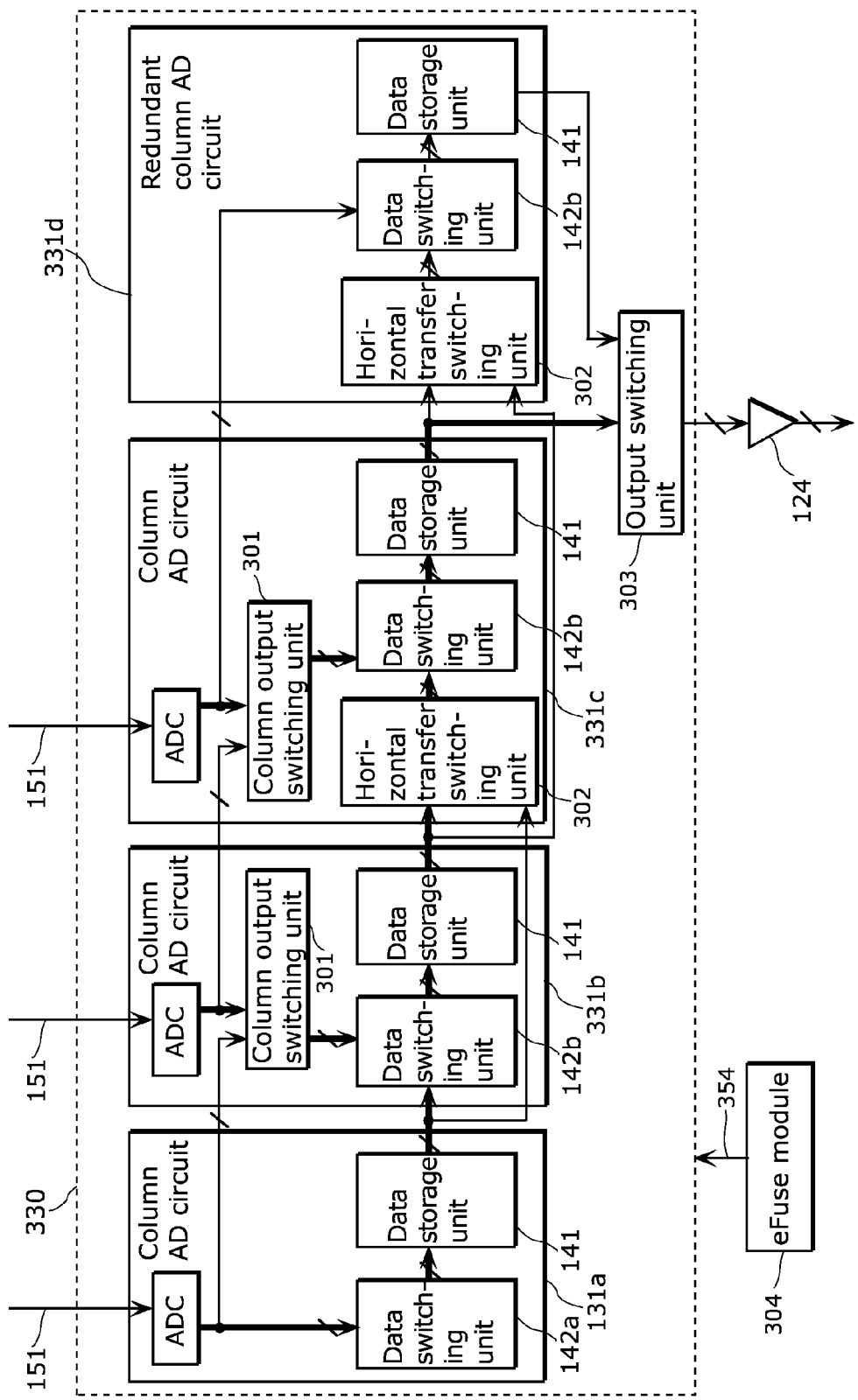
FIG. 14A is a block diagram showing a normal connection status of the column block according to the third embodiment of the present invention.

FIG. 14A is a block diagram showing a signal path that is effective when the circuits are free from a defect. The effective signal path is indicated by bold lines in FIG. 14A. In the subsequent drawings also, the signal path will be indicated by bold lines. As shown in FIG. 14A, the connection status of the column block 330 is the same as that of the column block 130 according to the first embodiment shown in FIG. 2, when the defective circuit is not present.

First, the solid-state imaging device 100 identifies the defective point. In the initial state, for example, the defect information 354 indicates that a defective circuit is not present. Accordingly, the column output switching unit 301, the horizontal transfer switching unit 302, and the output switching unit 303 each select the signal according to the defect information 354 indicating that a defective circuit is not present, thereby making up the connection status shown in FIG. 14A.

More specifically, all the column output switching units 301 select the output signal of the AD conversion unit 140 of the respective same columns. All the horizontal transfer switching units 302 each select the output signal of the data storage unit 141 of the first preceding column. The output switching unit 303 selects the output signal of the data storage unit 141 of the last column.

Then the operator can inspect, through the first defect detection and the second defect detection as in the first embodiment, whether a defective circuit is present and, in the case where a defective circuit is present, identify the column and the bit that have the defect.

The operator then stores the detection result in the eFuse module 304, as defect information 354. Further, in the case where a defective circuit has been detected, the column output switching unit 301, the horizontal transfer switching unit 302, and the output switching unit 303 switch the signal to select, according to the defect information 354 retained by the eFuse module 304.

Here, the aforementioned operation may be performed by a processing unit inside or outside the solid-state imaging device 100, instead of the operator.

A specific example will be given hereunder.

Figure 14B:
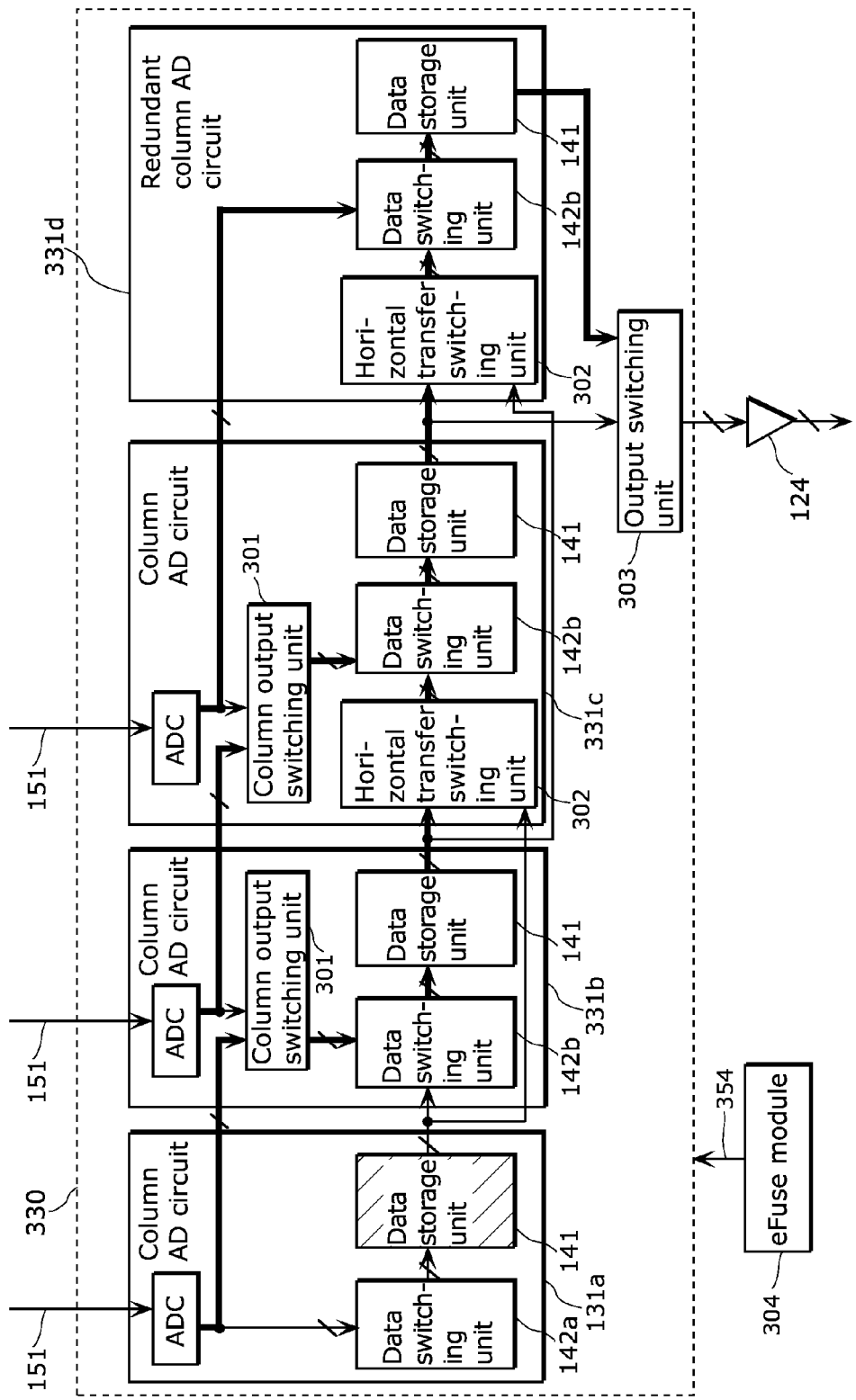
FIG. 14B is a block diagram showing a connection status of the column block with a defect, according to the third embodiment of the present invention.

FIG. 14B is a block diagram showing a signal path that is effective when the data storage unit 141 of the first column has a defect.

As shown in FIG. 14B, in the case where the data storage unit 141 of the first column has a defect, the data switching unit 142b and the data storage unit 141 of the second and subsequent columns are connected to the AD conversion unit 140 of the first preceding column, and the data switching unit 142b and the data storage unit 141 of the redundant column (redundant column AD circuit 331d) is connected to the AD conversion unit 140 of the last column.

More specifically, the column output switching units 301 of the second and subsequent columns each select the digital data 154 outputted by the AD conversion unit 140 of the first preceding column. The horizontal transfer switching units 302 of the third and subsequent columns and the redundant column each select the output signal of the data storage unit 141 of the first preceding column.

In addition, the output switching unit 303 selects the output signal of the data storage unit 141 of the redundant column.

Figure 14C:
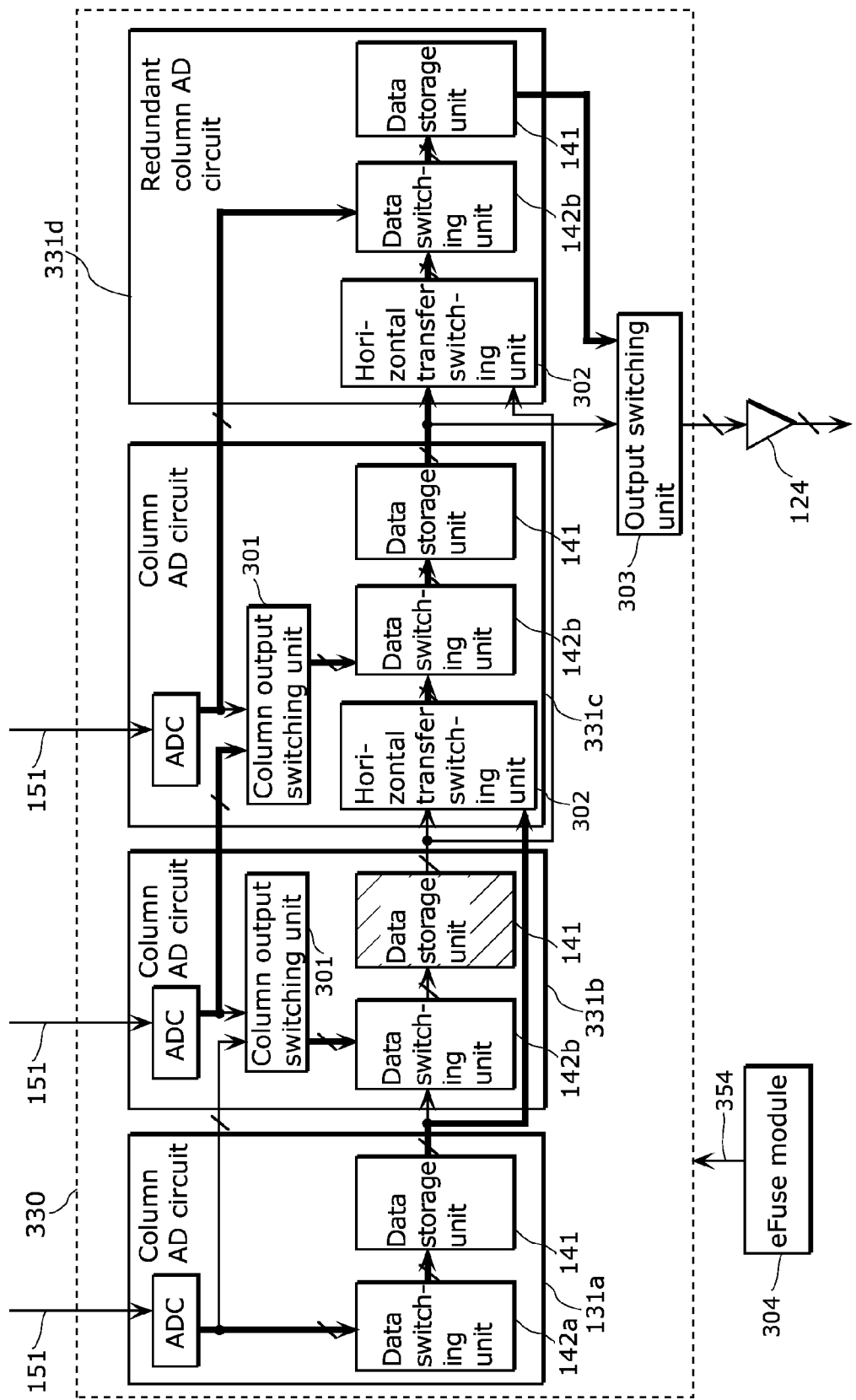
FIG. 14C is another block diagram showing a connection status of the column block with a defect, according to the third embodiment of the present invention.

FIG. 14C is a block diagram showing a signal path that is effective when the data storage unit 141 of the second column has a defect.

As shown in FIG. 14C, in the case where the data storage unit 141 of the second column has a defect, the column AD circuit 131a of the first column presents the normal connection status. The data switching unit 142b and the data storage unit 141 of the third and subsequent columns are connected to the AD conversion unit 140 of the first preceding column, and the data switching unit 142b and the data storage unit 141 of the redundant column (redundant column AD circuit 331d) are connected to the AD conversion unit 140 of the last column.

More specifically, the column output switching units 301 of the third and subsequent columns each select the digital data 154 outputted by the AD conversion unit 140 of the first preceding column. The horizontal transfer switching unit 302 of the third column selects the output signal of the data storage unit 141 of the second preceding column, i.e., the first column. In addition, the horizontal transfer switching unit 302 of the redundant column selects the output signal of the data storage unit 141 of the first preceding column.

Further, the output switching unit 303 selects the output signal of the data storage unit 141 of the redundant column.

Figure 14D:
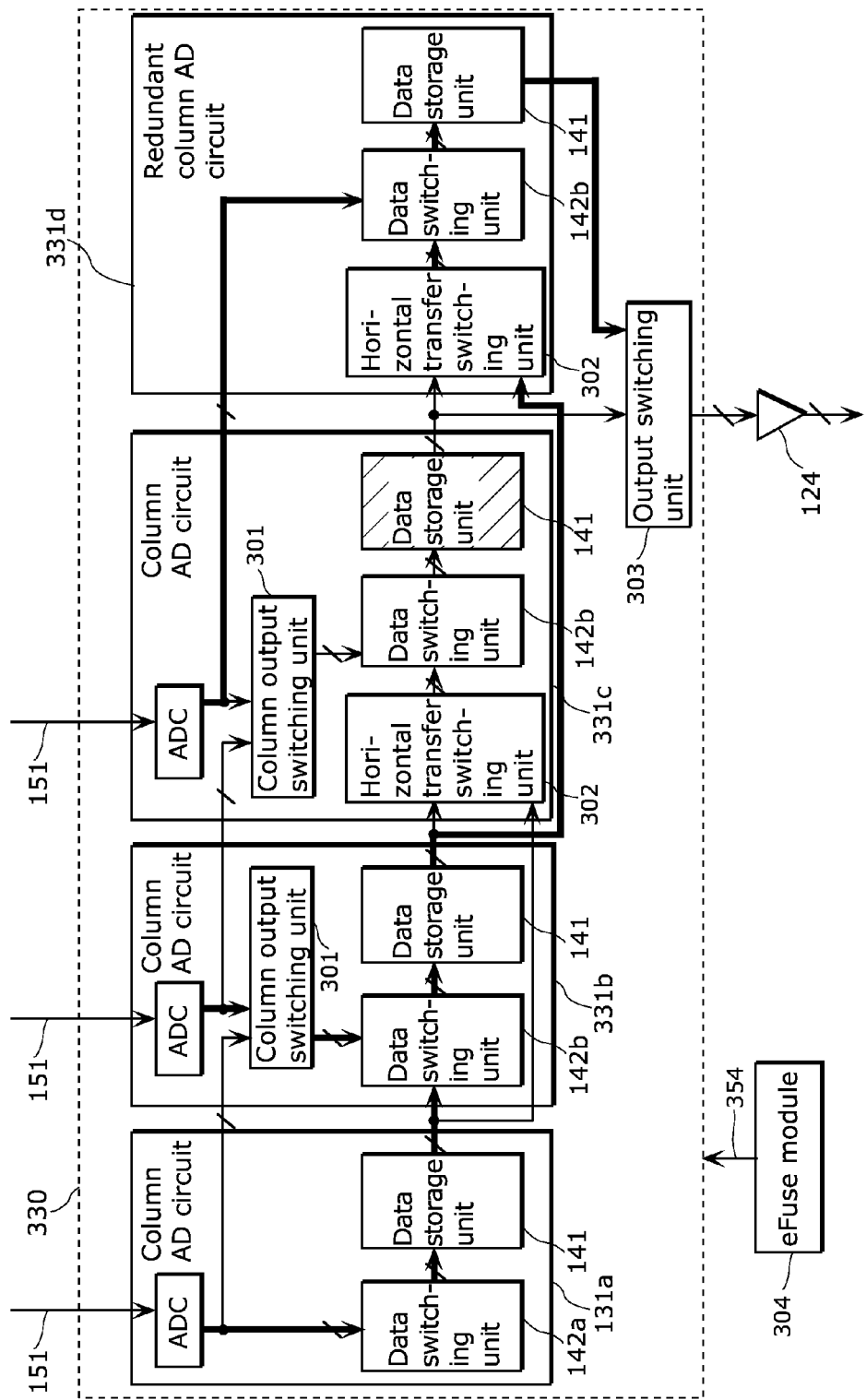
FIG. 14D is still another block diagram showing a connection status of the column block with a defect, according to the third embodiment of the present invention.

FIG. 14D is a block diagram showing a signal path that is effective when the data storage unit 141 of the third column has a defect.

As shown in FIG. 14D, in the case where the data storage unit 141 of the third column has a defect, the column AD circuits 131a and 331b of the first and the second column present the normal connection status. The data switching unit 142b and the data storage unit 141 of the redundant column are connected to the AD conversion unit 140 of the first preceding column, i.e., the last column.

More specifically, the column output switching unit 301 of the second column selects the digital data 154 outputted by the AD conversion unit 140 of the same column. The horizontal transfer switching unit 302 of the redundant column selects the output signal of the data storage unit 141 of the second preceding column, i.e., the second column.

Further, the output switching unit 303 selects the output signal of the data storage unit 141 of the redundant column.

Thus, in the case where a defect has arisen in the g-th column, the data switching units 142a and 142b of the columns preceding the g-th column receive the output signal of the AD conversion unit 140 of the respective same columns, and the data switching units 142b of the redundant column and the columns subsequent to the g-th column receive the output signal of the AD conversion unit 140 of the respective first preceding columns. Further, the data switching unit 142b of the first subsequent column of the g-th column receives the output signal of the data storage unit 141 of the second preceding column, and the data switching units 142b of the remaining columns receive the output signal of the data storage unit 141 of the respective first preceding columns.

As described above, the solid-state imaging device 100 according to the third embodiment is capable of replacing the data storage unit 141 in which a defect has arisen with the normal data storage unit 141.

Fourth Embodiment

In the third embodiment, the redundant circuit is provided in the level of the columns. In a fourth embodiment, the redundant circuit is provided in the level of the bits.

Figure 15A:
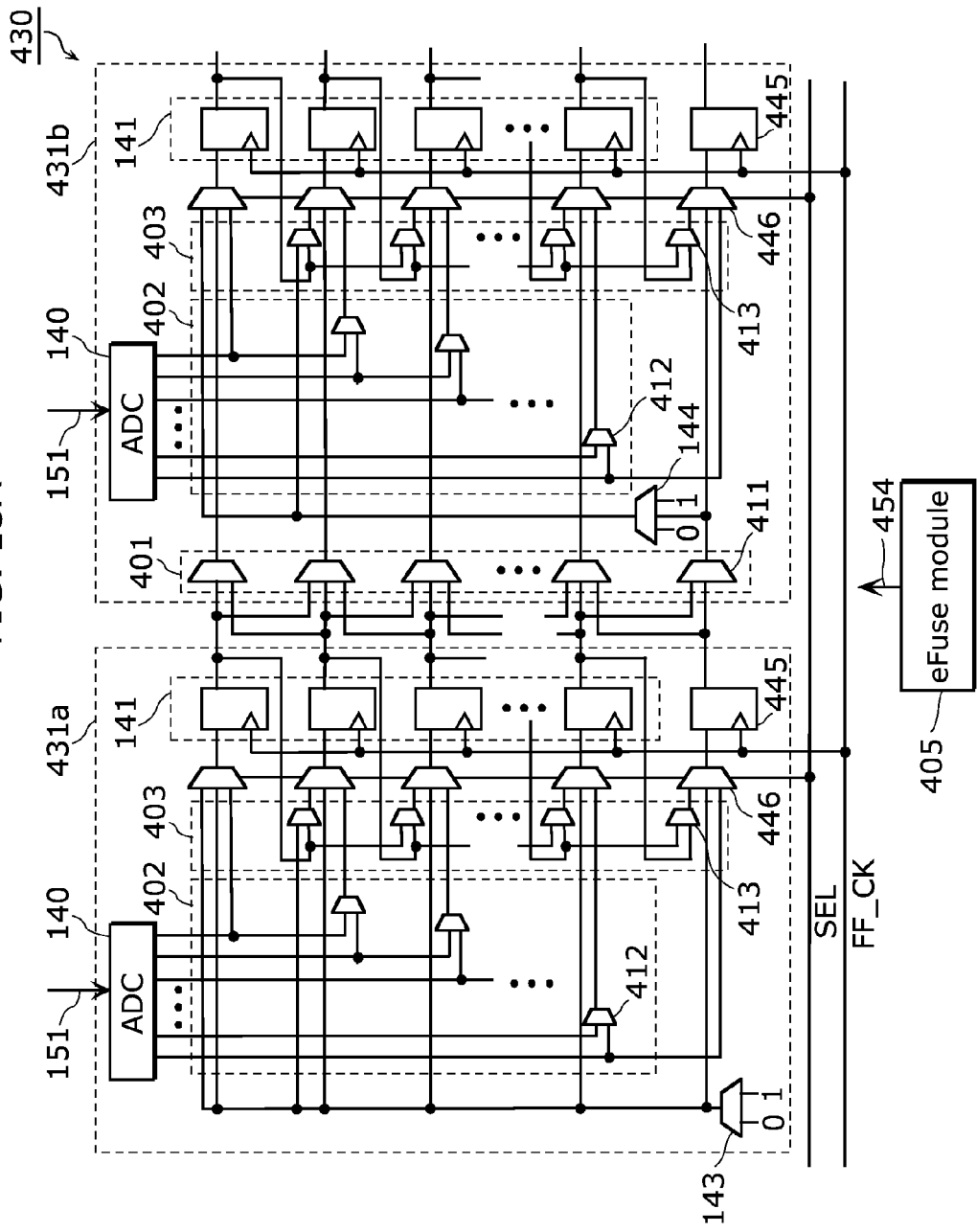
FIG. 15A is a circuit diagram showing a configuration of a column block according to a fourth embodiment of the present invention.
Figure 15B:
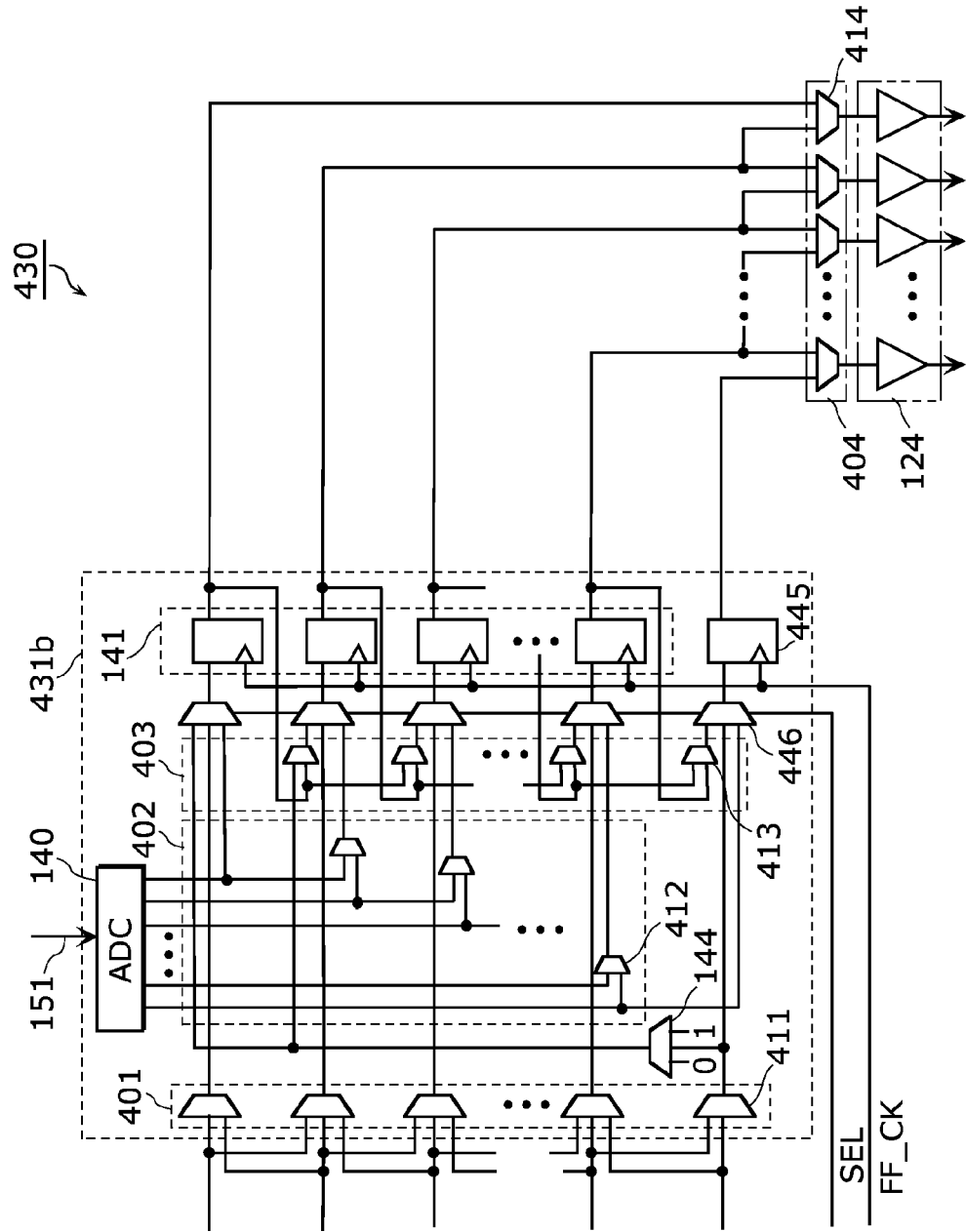
FIG. 15B is another circuit diagram of the column block according to the fourth embodiment of the present invention.

FIGS. 15A and 15B are circuit diagrams of a column block 430 and peripheral circuits according to the fourth embodiment of the present invention, FIG. 15A showing a column AD circuit 431a of the first column and a column AD circuit 431b of the second column, and FIG. 15B showing a column AD circuit 431b of the last column. The majority of the configuration shown in FIGS. 15A and 15B is the same as that of FIG. 3, and therefore differences will be primarily described hereunder.

The column block 430 shown in FIGS. 15A and 15B includes an output switching unit 404, in addition to the configuration of the column block 130 shown in FIG. 3. Further, the configuration of the column AD circuit 431a of the first column is different from that of the column AD circuit 131a, and the configuration of the column AD circuit 431b of the second and subsequent columns is different from that of the column AD circuit 131b.

In addition, the solid-state imaging device 100 according to the fourth embodiment includes an eFuse module 405.

Although each column block 430 includes three columns in this embodiment for the sake of clarity, the number of columns may be different.

The column AD circuit 431a of the first column includes a selector 446 and a FF 445 corresponding to the (N+1)th bit, a bit output switching unit 402, and a vertical transfer switching unit 403, in addition to the configuration of the column AD circuit 131a.

The column AD circuits 431b of the second and subsequent columns each include a horizontal transfer switching unit 401, in addition to the configuration of the column AD circuit 431a.

The bit output switching unit 402 selects N pieces of selectors 146 and 446 out of the selectors 146 and 446 respectively corresponding to the (N+1) bits of the same column, and outputs the digital data 154 of N bits outputted from the AD conversion unit 140 of the same column, to the selected N pieces of selectors 146 and 446. The bit output switching unit 402 includes (N−1) pieces of selectors 412. The (N−1) pieces of selectors 412 respectively correspond to the second to the N-th bits.

The selectors 412 each select one of the corresponding bit and the first lower bit out of the N bits of the digital data 154, and output the data of the selected bit to the selector 146 corresponding to the bit of the selectors 412.

The vertical transfer switching unit 403 selects N pieces of FFs out of the FFs 145 and 445 corresponding to the (N+1) bits of the same column, and serially connects the selected N pieces of FFs in the vertical shifting process. The vertical transfer switching unit 403 includes N pieces of selectors 413. The N pieces of selectors 413 respectively correspond to the second to the (N+1)th bits.

The selector 413 corresponding to the second bit selects one of the output signal of the FF 145 corresponding to the first lower bit and the output signal of the logic level switching unit 143, and outputs the selected signal to the selector 146 corresponding to the second bit.

The selectors 413 respectively corresponding to the third to the (N+1)th bits each select one of the output signal of the FF 145 corresponding to the first lower bit and the output signal of the FF 145 corresponding to the second lower bit, and output the selected signal to the selector 146 or 446 of the corresponding bit.

The horizontal transfer switching unit 401 selects the data of N bits out of the data of (N+1) bits retained by the FFs 145 and 445 corresponding to the (N+1) bits of the first preceding column, and selects the selectors 146 and 446 corresponding to N bits out of the selectors 146 and 446 corresponding to the (N+1) bits of the column associated with the horizontal transfer switching unit 401. Then the horizontal transfer switching unit 401 outputs the selected data of N bits to the selectors 146 and 446 corresponding to the N bits.

The horizontal transfer switching unit 401 includes (N+1) pieces of selectors 411. The (N+1) pieces of selectors 411 respectively correspond to the first to the (N+1)th bits.

The selector 411 corresponding to the first bit selects one of the data retained by the FF 145 corresponding to the same bit of the first preceding column and the data retained by the FF 145 corresponding to the first higher bit of the first preceding column, and outputs the selected data to the selector 146 corresponding to the bit of the selector 411.

The selectors 411 corresponding to the second to the N-th bits each select one of the data retained by the FF 145 or 445 corresponding to the same bit of the first preceding column, the data retained by the FF 145 or 445 corresponding to the first lower bit of the first preceding column, and the data retained by the FF 145 or 445 corresponding to the first higher bit of the first preceding column, and outputs the selected data to the selector 146 corresponding to the same bit.

The selector 411 corresponding to the (N+1)th bit selects one of the data retained by the FF 145 or 445 corresponding to the same bit of the first preceding column and the data retained by the FF 145 or 445 corresponding to the first lower bit of the first preceding column, and outputs the selected data to the selector 446 corresponding to the same bit.

Thus, the selectors 146 corresponding to the second to the N-th bits of all the columns select the data selected by the selector 412 corresponding to the same bit, in the data capturing process.

The selectors 146 and 446 corresponding to the second and subsequent bits of all the columns select the data selected by the selector 413 corresponding to the same bit, in the vertical shifting process.

Further, the selectors 146 and 446 corresponding to the second and subsequent columns select the data selected by the selector 411 corresponding to the same bit, in the horizontal shifting process.

The output switching unit 404 selects the data of N bits out of the data of (N+1) bits retained by the FFs 145 and 445 of the last column, and outputs the selected data of N bits to the output driver 124. The output switching unit 404 includes N pieces of selectors 414. The N pieces of selectors 414 respectively correspond to the first to the N-th bits.

The selectors 414 each select one of the data retained by the FF 145 or 445 corresponding to the same bit of the last column and the data retained by the FF 145 or 445 corresponding to the first higher bit of the last column, and outputs the selected data to the output driver 124.

The eFuse module 405 retains defect information 454 indicating whether a defective circuit is present, and which of the columns and bits correspond to the FF 145 that has the defect. The horizontal transfer switching unit 401, the bit output switching unit 402, the vertical transfer switching unit 403 and the output switching unit 404 correspond to the redundant switching unit according to the present invention, and replace the FF 145 corresponding to the column and the bit indicated by the defect information 454 with a FF 145 provided in the same column.

An operation of the solid-state imaging device 100 according to the fourth embodiment will now be described hereunder.

In order to identify the defective point, the solid-state imaging device 100 first arranges the connection status of the column block 430 in the same manner as the column block 130 shown in FIG. 3. In the initial state, for example, the defect information 454 indicates that a defective circuit is not present. Accordingly, the horizontal transfer switching unit 401, the bit output switching unit 402, the vertical transfer switching unit 403, and the output switching unit 404 each select the signal according to the defect information 454 indicating that a defective circuit is not present, thereby making up the connection status in the column block 430 similarly to the column block 130 shown in FIG. 3.

More specifically, the vertical transfer switching unit 403 selects the output signal of the FF 145 corresponding to the first lower bit of the same column. The horizontal transfer switching unit 401 selects the output signal of the FF 145 corresponding to the same bit of the first preceding column.

The bit output switching unit 402 selects the output signal of the same bit of the AD conversion unit 140.

Further, the output switching unit 404 selects the data of the first to the N-th bits out of the data of (N+1) bits retained by the FFs 145 and 445 of the last column.

Then the operator can inspect, through the first defect detection and the second defect detection as in the first embodiment, whether a defective circuit is present and, in the case where a defective circuit is present, identify the column and the bit that have the defect.

The operator then stores the detection result in the eFuse module 405, as defect information 454. Further, in the case where a defective circuit has been detected, the horizontal transfer switching unit 401, the bit output switching unit 402, the vertical transfer switching unit 403, and the output switching unit 404 switch the signal to select, according to the defect information 454 retained by the eFuse module 405.

A specific example will be given hereunder.

Figure 16A:
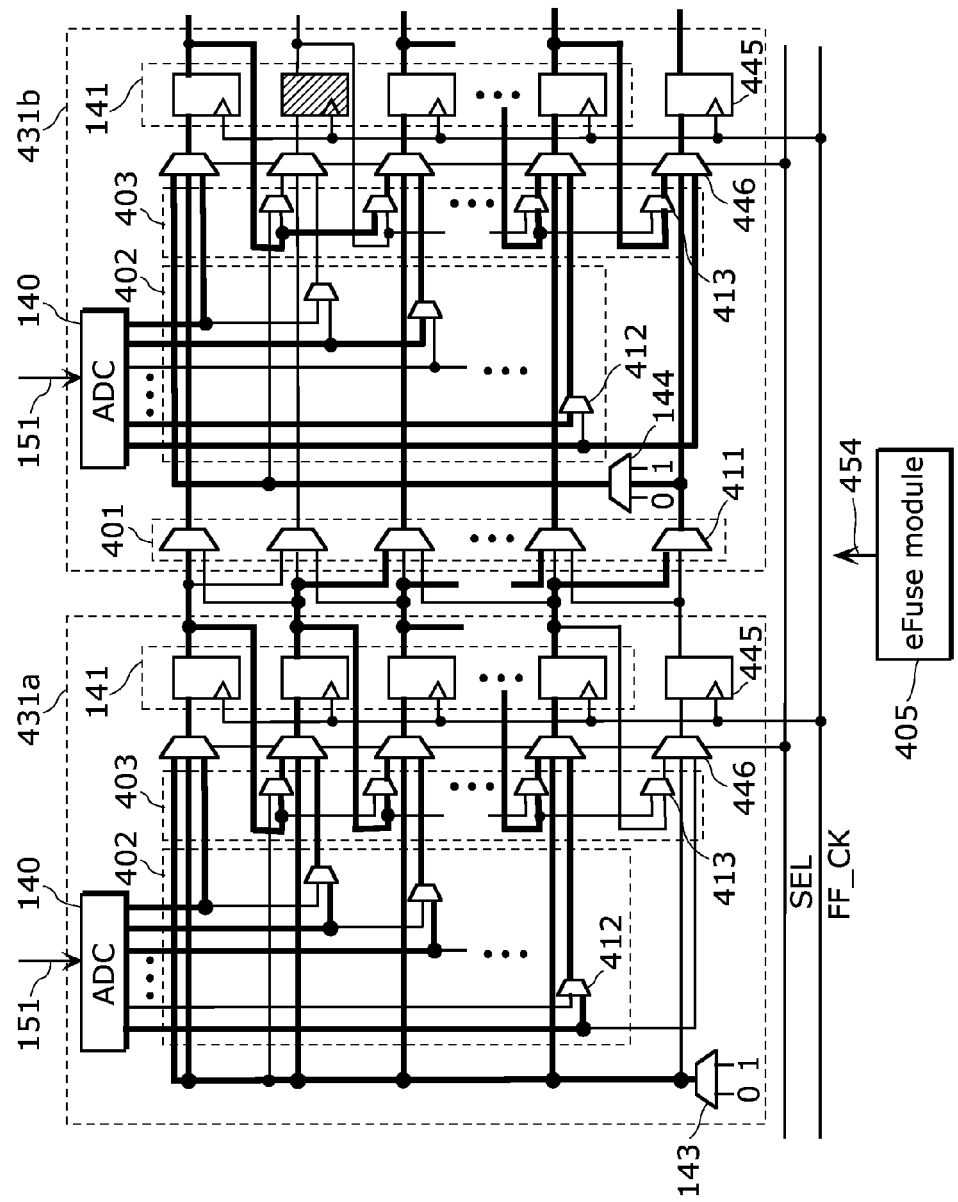
FIG. 16A is a circuit diagram showing a connection status of the column block with a defect, according to the fourth embodiment of the present invention.
Figure 16B:
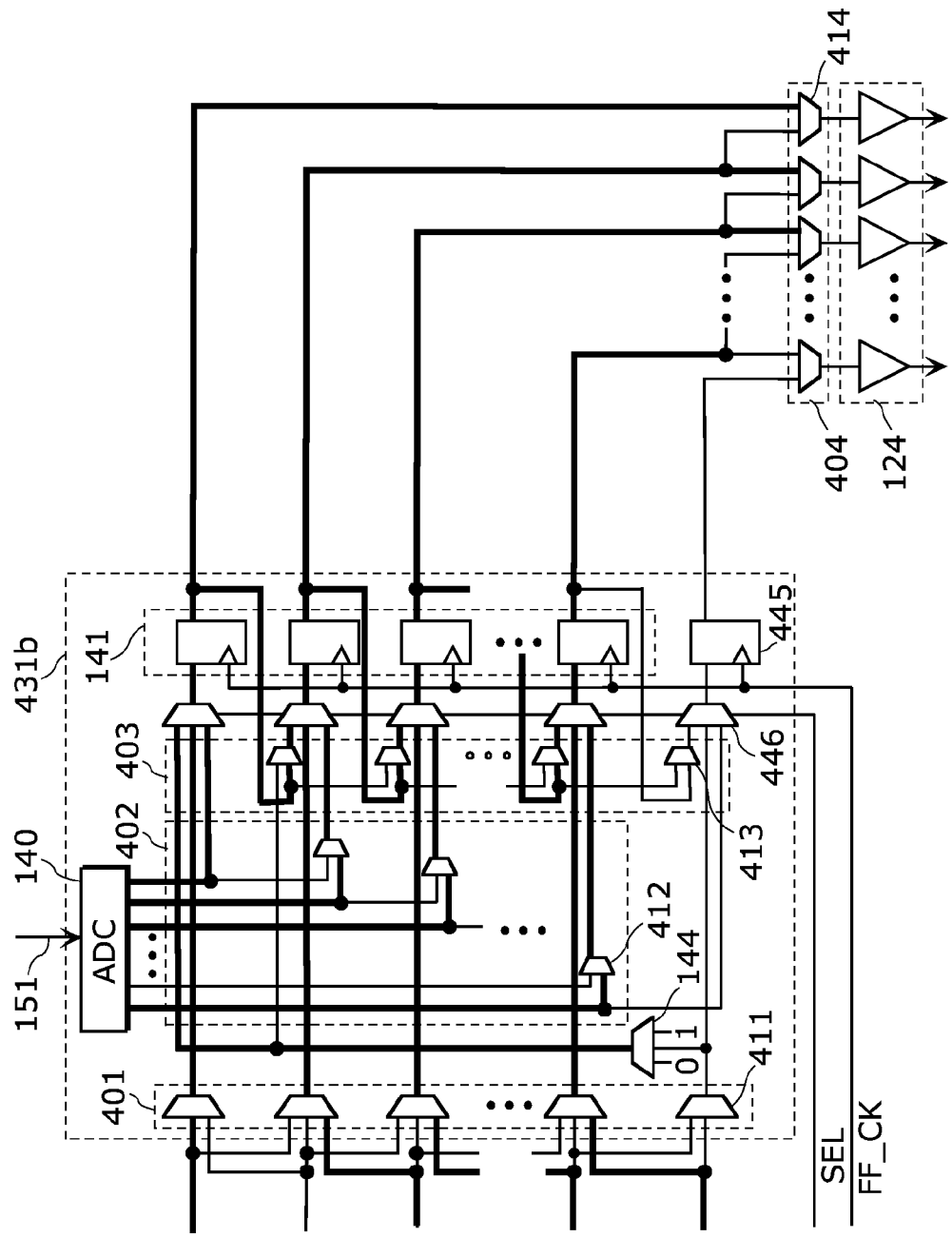
FIG. 16B is another circuit diagram showing a connection status of the column block with a defect, according to the fourth embodiment of the present invention.

FIGS. 16A and 16B are circuit diagrams showing signal paths that are effective when the FF 145 corresponding to the second bit of the second column has a defect.

As shown in FIG. 16A, the connection status in the column AD circuit 431*a* of the first preceding column of the column having the defect, i.e., the first column, is the same as the connection status of a column where a defective circuit is not present.

The horizontal transfer switching unit 401 of the second column having the defect selects the data of the first to the N-th bits stored in the data storage unit 141 of the first preceding column, and outputs the data of N bits to the selectors 146 and 446 corresponding to the first bit and the third to the (N+1)th bits, except for the defective bit (second bit). Accordingly, in the horizontal shifting process the effective data is retained by the FFs 145 and 445 corresponding to the first bit and the third to the (N+1)th bits, totally N bits.

The bit output switching unit 402 of the second column having the defect outputs the output signal of N bits from the AD conversion unit 140 to the selectors 146 and 446 corresponding to the first bit and the third to the (N+1)th bits, which are free from a defect. Accordingly, in the data capturing process the effective data is retained by the FFs 145 and 445 corresponding to the first bit and the third to the (N+1)th bits, totally N bits.

The vertical transfer switching unit 403 of the second column having the defect serially connects the FFs 145 and FF 445 corresponding to the first bit and the third to the (N+1)th bits, in the vertical shifting process.

The horizontal transfer switching unit 401 of the first subsequent column of the column having the defect (third column) selects the data of the first bit and the third to the (N+1)th bits except for the defective bit (second bit) out of the data of (N+1) bits retained in the data storage unit 141 of the second column having the defect, and outputs the data of totally N bits to the selectors 146 corresponding to the first to the N-th bits of the column associated with the horizontal transfer switching unit 401. Accordingly, the effective data is retained by the FFs 145 corresponding to the first to the N-th bits, in the horizontal shifting process.

The connection status of the bit output switching unit 402 and the vertical transfer switching unit 403 in the first subsequent column of the column having the defect, i.e., the third column, is the same as the connection status of a column free from a defect.

Likewise, the connection status of the column AD circuit 431*b* in the second and subsequent columns of the column having the defect is the same as the connection status of a column free from a defect.

In the case where the last column is free from a defect, the output switching unit 404 selects the data of the first to the N-th bits out of the data of (N+1) bits retained by the FFs 145 and 445 of the last column, and outputs the selected data to the output driver 124.

Figure 16C:
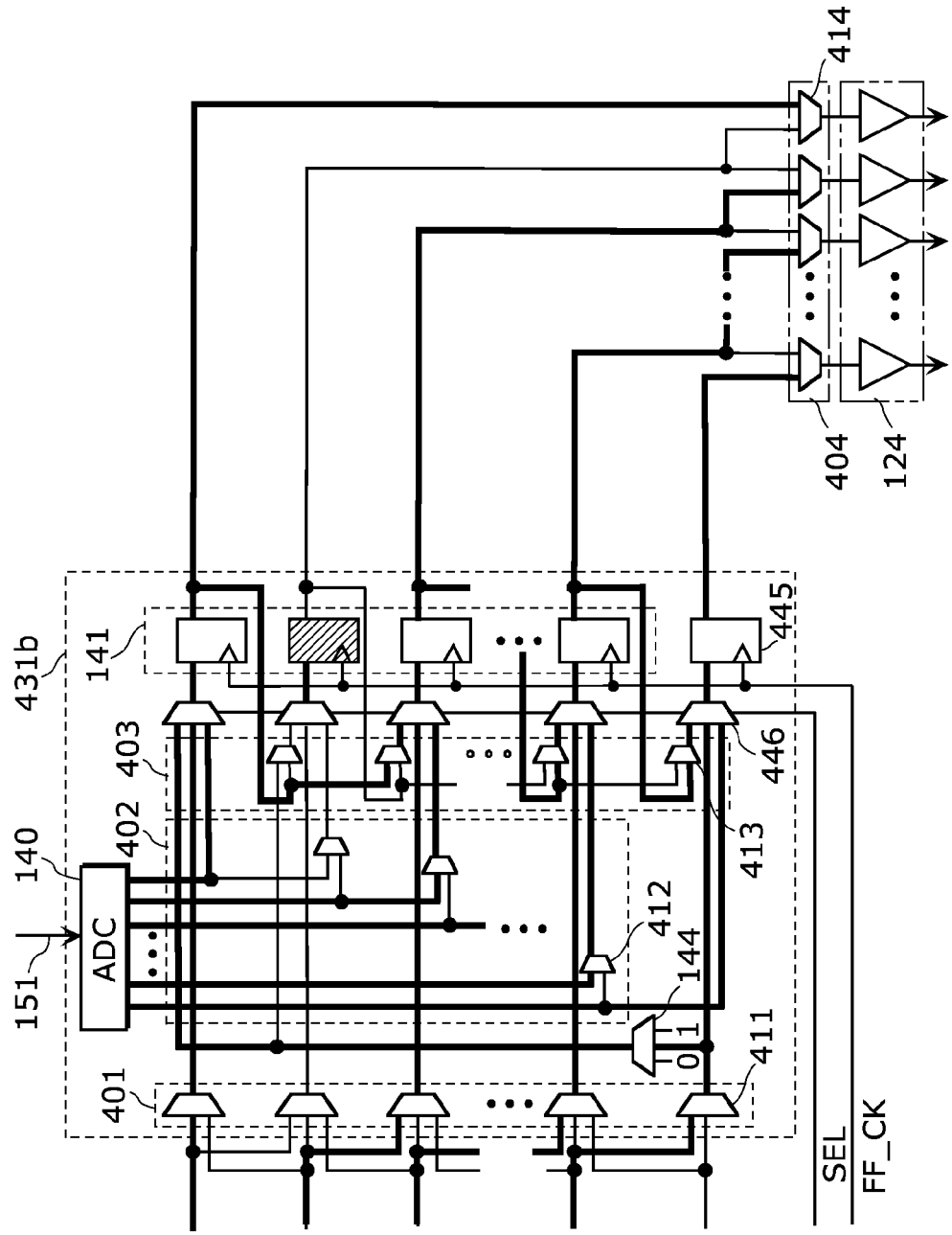
FIG. 16C is still another circuit diagram showing a connection status of the column block with a defect, according to the fourth embodiment of the present invention.
Figure 17:
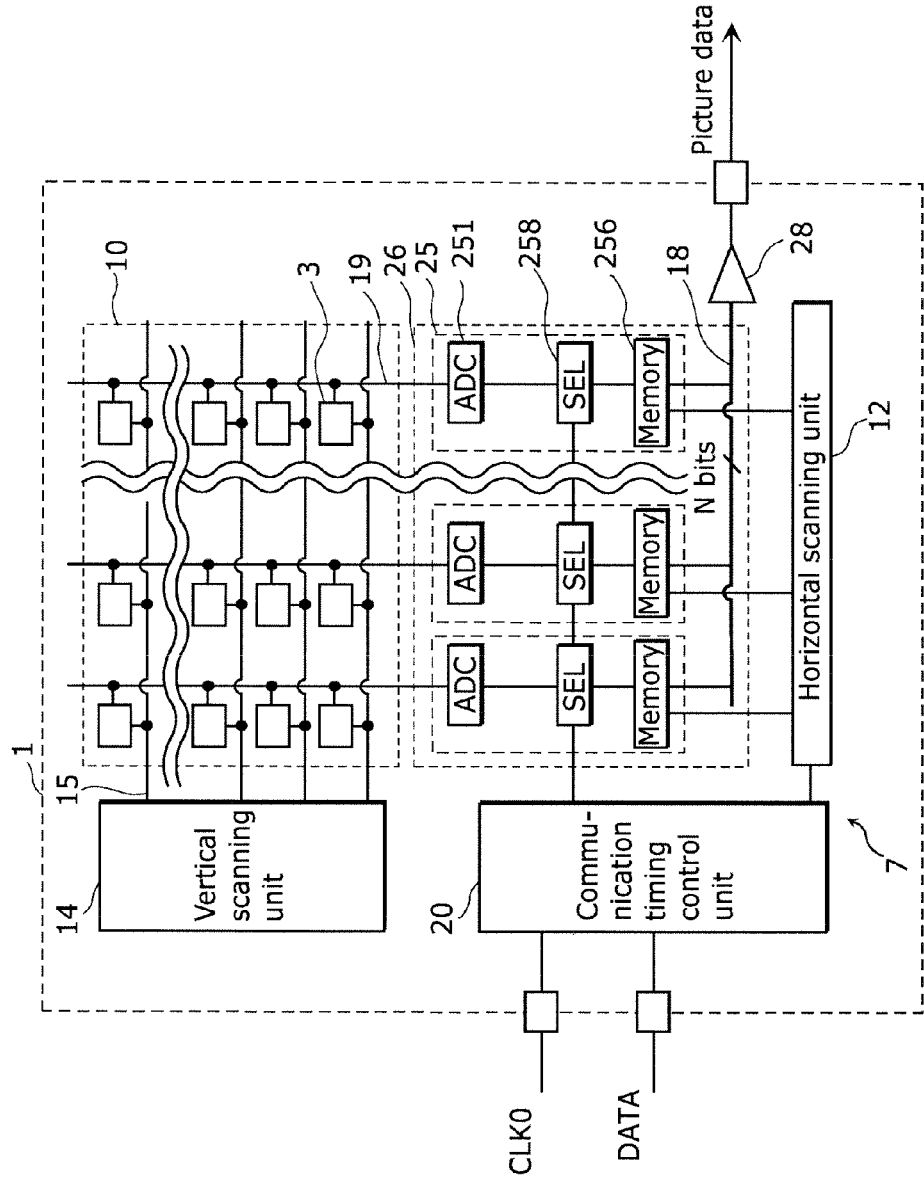
FIG. 17 is a block diagram showing a configuration of a conventional solid-state imaging device.

FIG. 16C is a circuit diagram showing a signal path that is effective when the last column has a defect.

In the case where the FF 145 corresponding to the second bit of the last column is defective as shown in FIG. 16C, the output switching unit 404 selects the data of the first bit and the third to the (N+1)th bits except for the defective bit, out of the data of (N+1) bits retained by the FFs 145 and 445 of the last column, and outputs the selected data to the output driver 124.

As described above, the solid-state imaging device 100 according to the fourth embodiment is capable of replacing the data storage unit 141 in which a defect has arisen with the normal data storage unit 141.

Additional Embodiments

In the foregoing embodiments, the logic level switching unit 143 is set to output the logic level of the value "1" for detecting a defect in the data storage unit 141. However, the logic level may be varied for each bit. In this case, not only a defect of an individual bit but also a defect arising from interference between the bits can be detected.

In the foregoing embodiments, the logic level switching unit 143 outputs the logic level to the data storage unit 141 for detecting a defect in the data storage unit 141. Alternatively, a data signal DATA may be inputted from outside and a desired value according to the data signal DATA may be outputted to the data storage unit 141.

In the foregoing embodiments, the output driver 124 of each column block is controlled to serially output the signals through the horizontal signal line 127 for detecting a defect in the data storage unit 141. Alternatively, the horizontal signal line 127 may be individually provided for each column block, to output the signals of each column block in parallel.

Although the column blocks 330 each include a redundant column AD circuit 331*d* in the third embodiment, each column block 330 may include two or more redundant column AD circuits 331*d*.

Although each column includes FFs 445 each corresponding to 1 bit in the fourth embodiment, each FF 445 may correspond to two or more bits.

In the third and the fourth embodiment, the eFuse module is employed to retain the defect information. Alternatively, the detection result may be stored in a non-volatile memory to write the detection result by serial inputting in a controlling register from the non-volatile memory when the imaging device is turned on, and to control the switching units according to the detection result (defect information) retained by the controlling register.

Further, although each column block includes a plurality of columns in the foregoing embodiments, the logic level switching unit 143 may be provided in each column, which eliminates the need to input the output signal of the data storage unit 141 of another column to the data switching units 142*a* and 142*b*. Such a configuration allows the wirings between the data storage units 141 of different columns to be excluded, thereby enabling the circuit scale to be reduced.

The solid-state imaging device according to the foregoing embodiments may be incorporated in a digital camera and the like. The digital camera includes an optical system including lenses for forming an image on an imaging surface of a solid-state image sensor on the basis of incident light from a subject, a control unit that controls the operation of the solid-state image sensor, and an image processing unit that performs various signal processings on output signals from the solid-state image sensor.

The functional blocks of the solid-state imaging device according to the first to the fourth embodiments are typically realized as a large scale integration (LSI) which is a type of integrated circuit. Those functional blocks may be individually implemented in separate chips, or a single chip may include a part or whole of the functional blocks.

In addition, the integration may be achieved by an exclusive circuit or a general-use processor, instead of employing the LSI. After manufacturing the LSI, a field programmable gate array (FPGA), or a reconfigurable processor that accepts reconfiguration of connection or setting of circuit cells inside the LSI may be employed.

A part of the functions of the solid-state imaging device according to the first to the fourth embodiments may be realized by a processor such as a CPU that performs a program.

Further, the present invention may be realized as the mentioned program, or a recording medium on which the program is recorded. Naturally, such a program may be distributed through a communication network such as Internet.

At least a part of the configuration or functions of the solid-state imaging device according to the first to the fourth embodiments, and the variations thereof, may be combined.

The numerical values cited in the foregoing embodiments are merely examples for clearer understanding, and not intended to limit the present invention. The logic level expressed as high/low ("0", "1") and the switching status expressed as on/off are merely examples for clearer understanding of the present invention, and equivalent effects may be attained by adopting different combinations of the logic level or switching status. The configurations of the logic circuit described above are merely examples for clearer understanding of the present invention, and equivalent effects may be attained by adopting different configurations of the logic circuit. Further, the forms of connection between the constituents cited in the embodiments are merely examples for clearer understanding of the present invention, and naturally the forms of connection that can realize the functions of the present invention are not limited to those described above.

Still further, the sequences in which the aforementioned steps are performed are merely examples for clearer understanding of the present invention, and different sequences may be adopted. In addition, a part of the foregoing steps may be performed at the same time as (parallel to) another step.

Although only some exemplary embodiments of the present invention have been described in detail above, those skilled in the art will readily appreciate that many modifications are possible in the exemplary embodiments without materially departing from the novel teachings and advantages of the present invention. Accordingly, all such modifications are intended to be included within the scope of the present invention.

INDUSTRIAL APPLICABILITY

The present invention is applicable to solid-state imaging devices. The present invention is usefully applicable to imaging devices such as a digital camera, a video camera, and a mobile phone with camera function.

The invention claimed is:

1. A solid-state imaging device, comprising:
    a plurality of unit pixels that each converts incident light into a pixel signal, the unit pixels being arranged in rows and columns;
    a plurality of AD conversion units respectively provided in a plurality of columns and each configured to convert the pixel signal converted by the unit pixel located in an associated column into digital data of N bits, N being an integer not smaller than 2; and
    a plurality of data storage units respectively provided in the plurality of columns,
    wherein the data storage units each include N flip-flop circuits respectively corresponding to bits of the digital data of N bits,
    the solid-state imaging device further comprising:
    a plurality of data switching units each configured to switch between:
    a first state in which the digital data of N bits converted by the AD conversion unit is stored in the data storage unit of the associated column; and
    a second state in which the N flip-flop circuits included in each of the data storage units are serially connected.

2. The solid-state imaging device according to claim 1, wherein the data switching units are configured to switch among the first state, the second state, and a third state in which the data storage units respectively provided in the plurality of columns are serially connected.

3. The solid-state imaging device according to claim 2, comprising
    a plurality of column blocks each associated with a column unit including a predetermined number of columns, and each including a plurality of the AD conversion units and a plurality of the data storage units, the AD conversion units and the data storage units being associated with the column unit,
    wherein the data switching units are configured to serially connect, in each of the column blocks, the data storage units in the column block in the third state.

4. The solid-state imaging device according to claim 3, Wherein the data switching units are configured to serially connect, in each of the column blocks, all of the flip-flop circuits in the column block in the second state.

5. The solid-state imaging device according to claim 1, further comprising
    a control unit configured to control the data storage units and the data switching units,
    wherein the control unit is configured to:
    store the digital data of N bits converted by the AD conversion unit in the data storage unit of the associated column after setting the data switching units to the first state; and
    amplify the digital data stored in the data storage unit by shifting each bit of the digital data toward a high-order bit, after setting the data switching units to the second state.

6. The solid-state imaging device according to claim 2, wherein the data switching units are configured to serially connect, in the second state, the flip-flop circuits each located at a first stage of the N flip-flop circuits serially connected in the associated column, in the same sequence as in the third state.

7. The solid-state imaging device according to claim 1, wherein the data switching units each include a logic level switching unit configured to output, in the second state, a signal of a first logical value to the flip-flop circuit at a first stage of the N flip-flop circuits serially connected.

8. The solid-state imaging device according to claim 7, wherein the logic level switching unit is configured to selectively output, in the second state, one of the signal of the first logical value and a signal of a second logical value to the flip-flop circuit at the first stage.

9. The solid-state imaging device according to claim 3, wherein the data switching units each include a logic level switching unit configured to output, in the third state, a signal of a first logical value to the data storage unit at a first stage of the data storage units serially connected.

10. The solid-state imaging device according to claim 9, wherein the logic level switching unit is configured to selectively output, in the third state, one of the signal of the first logical value and a signal of a second logical value to the data storage unit at the first stage.

11. The solid-state imaging device according to claim 10, wherein the logic level switching unit is further configured to selectively output, in the second state, one of the signal of the first logical value and the signal of the second logical value to the flip-flop circuit at the first stage of the N flip-flop circuits serially connected.

12. The solid-state imaging device according to claim 2, further comprising
a control unit configured to provide (i) a clock signal of a first frequency to the plurality of flip-flop circuits, after setting the data switching unit to the first state, and (ii) a clock signal of a second frequency lower than the first frequency to the flip-flop circuits, after setting the data switching unit to the second state.

13. The solid-state imaging device according to claim 12, wherein the control unit is further configured to provide the clock signal of the first frequency to the flip-flop circuits, after setting the data switching unit to the third state.

14. The solid-state imaging device according to claim 1, further comprising:
a defect information storage unit configured to store defect information indicating a data storage unit of which column has a defect, among the plurality of data storage units;
a redundant data storage unit; and
a redundant switching unit configured to replace the data storage unit of the column indicated by the defect information, with the redundant data storage unit.

15. The solid-state imaging device according to claim 1, further comprising:
a defect information storage unit configured to store defect information indicating a flip-flop circuit of which column and which bit has a defect, among the plurality of flip-flop circuits;
a plurality of redundant flip-flop circuits respectively provided in the plurality of columns; and
a redundant switching unit configured to replace the flip-flop circuit of the column and the bit indicated by the defect information, with the redundant flip-flop circuit provided in the corresponding column.

16. An imaging device comprising the solid-state imaging device according to claim 1.

* * * * *